US006234926B1

(12) United States Patent
Soon et al.

(10) Patent No.: US 6,234,926 B1

(45) Date of Patent: May 22, 2001

(54) TOOL FOR A CABLE FIXING BOLT

(75) Inventors: Yeo Yong Soon, Singapore (SG); Kazuo Wada, Kawachinagano (JP)

(73) Assignees: Shimano Inc., Osaka (JP); Shimano (Singapore) Pte., Ltd., Jurong Town (SI)

( * ) Notice: Subject to any disclaimer, the term of this patent is extended or adjusted under 35 U.S.C. 154(b) by 0 days.

(21) Appl. No.: 09/321,822

(22) Filed: May 28, 1999

(51) Int. Cl.$^7$ .............................. F16H 59/00; F16B 39/10; B62L 1/00

(52) U.S. Cl. .............................. 474/80; 474/82; 411/199; 188/24.11

(58) Field of Search .............................. 474/80, 82, 78, 474/81, 69, 119, 122, 127; 411/198, 199, 197, 175, 119, 174, 120, 167, 918, 229, 326, 951; 74/502.6, 502.4, 473.14, 480 R, 502.2; 188/24.11, 24.99

(56) References Cited

U.S. PATENT DOCUMENTS 2,398,827 * 4/1946 Graham et al. .................. 411/167
2,771,113 * 11/1956 Flora .................................. 411/167
4,290,506 * 9/1981 Nagano et al. ................... 188/24.19
4,545,858 * 10/1985 Nagano ............................ 188/24.19
5,649,797 * 7/1997 Warren et al. .................. 411/120 X
5,728,018 * 3/1998 Terada et al. ........................ 474/80
5,779,581 * 7/1998 Fujii ..................................... 474/82
5,809,840 * 9/1998 Oda et al. ........................ 74/502.6
5,941,125 * 8/1999 Watarai et al. .................. 74/473.14
6,010,289 * 1/2000 DiStasio et al. ...................... 411/174

FOREIGN PATENT DOCUMENTS

2825220 * 12/1979 (DE) .
3525947 * 1/1987 (DE) .
2658360 * 9/1991 (DE) .
4006463 * 9/1991 (DE) .
572693 10/1993 (JP) .

* cited by examiner

*Primary Examiner*—David Fenstermacher
*Assistant Examiner*—Marcus Charles
(74) *Attorney, Agent, or Firm*—Shinjyu Global IP Conselors, LLP

(57) ABSTRACT

A tool is provided for holding a cable fixing bolt of a bicycle component in a loose condition. This tool allows the cable fixing bolt to be shipped and stored in loose condition, while preventing the cable fixing bolt from falling out of a bicycle component. The tool can be used with the cable fixing bolt derailleurs or brake device. The tool basically has three portions. The first portion engages a head portion of the cable fixing bolt. The second portion is spaced from the first portion and is located adjacent a threaded shaft portion of the cable fixing bolt. The third portion is spaced from the second portion and engages a part of the bicycle component (e.g., a nut, a link or a brake arm). In each embodiment, the first, second and third portions are arranged relative one another to hold the cable fixing bolt in a loose condition, while preventing the cable fixing bolt from being disengaged from the part of the bicycle component. In selected embodiments where the tool is used with a rear derailleur, the third portion holds the rear derailleur in a retracted position.

29 Claims, 26 Drawing Sheets

TOOL FOR A CABLE FIXING BOLT

BACKGROUND OF THE INVENTION

1. Field of the Invention

This invention generally relates to a cable fixing bolt retaining tool or clip for holding a cable fixing bolt of a bicycle part. More specifically, the present invention relates a cable fixing bolt retaining tool or clip for aiding in the assembly of a bicycle component by maintaining the cable fixing bolt in a loose condition during shipping and/or storage.

2. Background Information

Bicycling is becoming an increasingly more popular form of recreation, as well as a means of transportation. Moreover, bicycling has become a very popular competitive sport for both amateurs and professionals. Whether the bicycle is used for recreation, transportation or competition, the bicycle industry is constantly improving the various components of the bicycle. Accordingly, bicycle owners are constantly upgrading the various bicycle components with the latest improvements and bicycle shops must carry the latest improvements in bicycle components.

Bicycle components, such as derailleurs and brakes, are typically operated by levers or operating devices coupled thereto via control cables. These control cables are typically coupled to the bicycle components by cable fixing bolts. In the past, when the bicycle component manufacturer would ship a derailleur or brake to the manufacturer or a bicycle store, the cable fixing bolt would have to be firmly tightened to prevent the cable fixing bolt from falling out. If the cable fixing bolt is too loose, the vibration during shipping can result in the cable fixing bolt falling out of the brake or derailleur and then becoming lost.

Upon receiving a brake or derailleur, the bicycle manufacturer or the individual bicycle dealer will have to loosen the cable fixing bolts in order to couple the control cable thereto. Depending upon the torque applied to the cable fixing bolt, the installer may have some difficulty in loosening the cable fixing bolt. If the cable fixing bolt is hard to loosen, then this will result in a more time consuming installation of the bicycle components, as well as possible frustration on the part of the installer.

In a low normal type rear derailleur, the tension pulley of the derailleur is normally biased to hold the chain on the low or large gear of the rear set of gears of the bicycle. In other words, the spring of the derailleur normally holds the rear derailleur in an extended position. Thus, low normal type rear derailleurs typically require large boxes for shipping. In order to reduce the size of a low normal type derailleur for shipping, a tool has been developed to hold the low normal type of derailleur in its retracted position. In other words, the tool is designed to hold the rear derailleur in a more compact position or shipping and storage. Specifically, this tool is located in the linkage assembly of the rear derailleur so as to hold the spring of the linkage assembly in a compressed or retracted position. More specifically, the tool holds the rear derailleur in a top gear position so as to be more compact. By using such a tool, a low normal type derailleur can be shipped in a smaller package. However, this tool does not prevent the cable fixing bolt from falling out of the derailleur.

In view of the above, there exists a need for a cable fixing bolt retaining tool or clip for holding a cable fixing bolt, which overcomes the above mentioned problems in the prior art. This invention addresses this need in the prior art as well as other needs, which will become apparent to those skilled in the art from this disclosure.

SUMMARY OF THE INVENTION

One object of the present invention is to provide a cable fixing bolt retaining tool or clip that holds a cable fixing bolt of a bicycle component in a loose condition during shipping and/or storage.

Another object of the present invention is to provide a cable fixing bolt retaining tool or clip for a cable fixing bolt that holds the rear derailleur in a compact position for shipping and/or storage.

Still another object of the present invention is to provide a cable fixing bolt retaining tool or clip for a cable fixing bolt that is inexpensive to manufacture.

The foregoing objects can basically be attained by providing a cable fixing bolt retaining tool or clip for holding a cable fixing bolt of a bicycle component in a loose condition. The tool allows the cable fixing bolt to be shipped and stored in loose condition, while preventing the cable fixing bolt from falling out of a bicycle component. The tool can be used with the cable fixing bolt of either a derailleur or a brake device. The tool basically has three portions. The first portion engages a head portion of the cable fixing bolt. The second portion is spaced from the first portion and is located adjacent a shaft portion of the cable fixing bolt. The third portion is spaced from the second portion and engages at least one of the shaft portion and a part of the bicycle component (e.g., a nut, a link or a brake arm). In each embodiment, the first, second and third portions are arranged relative one another to hold the cable fixing bolt in a loose condition, while preventing the cable fixing bolt from being disengaged from the part of the bicycle component. In selected embodiments where the tool is used with a rear derailleur, the third portion holds the rear derailleur in a retracted position.

The foregoing objects can basically be attained by providing a bicycle component assembly, comprising a bicycle component with a cable fixing bolt and a tool coupled to the bicycle component and/or the cable fixing bolt to hold the cable fixing bolt in a loose condition, while preventing the cable fixing bolt from being disengaged from the first bicycle part. The bicycle component has a first bicycle part with a threaded bolt receiving opening. The cable fixing bolt has a head portion and a shaft portion extending from the head portion to a free end. The shaft portion has threads formed thereon that are engaged with the threaded bolt receiving opening. The tool is removably coupled to the cable fixing bolt, and includes a first portion, a second portion and a third portion. The first portion engages the head portion of the cable fixing bolt. The second portion is located adjacent a portion of the shaft portion of the cable fixing bolt. The third portion engages at least one of the shaft portion and the first bicycle part. The first, second and third portions are arranged relative one another to hold the cable fixing bolt in a loose condition, while preventing the cable fixing bolt from being disengaged from the first bicycle part.

The foregoing objects can also basically be attained by providing a cable fixing bolt retaining tool or clip for holding a cable fixing bolt of a bicycle component. The tool or clip comprises a first portion, a second portion spaced from the first portion and a third portion spaced from the second portion. The first portion is adapted to engage to a head portion of the cable fixing bolt. The second portion is adapted to be located adjacent a shaft portion of the cable fixing bolt. The third portion is adapted to engage a part of the bicycle component. The first, second and third portions are arranged relative one another to hold the cable fixing bolt in a loose condition, while preventing the cable fixing bolt from being disengaged from the part of the bicycle component.

In accordance with another aspect of the present invention, a method is provided for holding a cable fixing bolt of a bicycle component in a loose condition. The method comprises the steps of providing a cable fixing bolt retaining tool or clip having a first portion, a second portion spaced from the first portion and a third portion spaced from the second portion; positioning the first portion of the tool to engage a head portion of the cable fixing bolt; positioning the second portion of the tool adjacent to a shaft portion of the cable fixing bolt; positioning the third portion of the tool to engage at least one of a first bicycle part of the bicycle component and a free end of the shaft portion. The first and second and third portions are arranged relative one another to hold the cable fixing bolt in the loose condition, while preventing the cable fixing bolt from being disengaged from the first bicycle part of the bicycle component.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
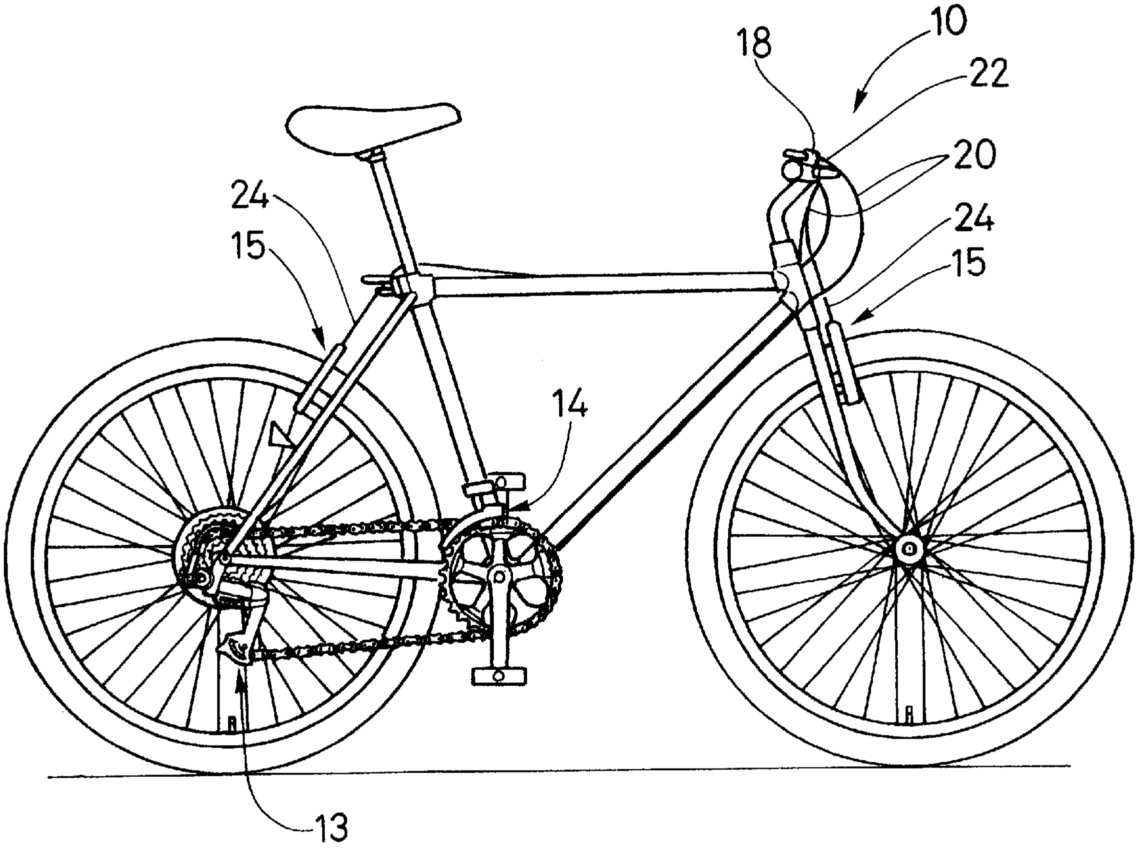
FIG. 1 is a partial side elevational view of a conventional bicycle in which a cable fixing bolt retaining clip or tool can be utilized in accordance with the present invention as seen in subsequent Figures.

Referring initially to FIG. 1, a conventional bicycle 10 is illustrated with various bicycle components. Many of these bicycle components are operated by levers or operating devices coupled thereto via cables. The cables are typically coupled to the bicycle components by cable fixing bolts. The present invention is directed to using a cable fixing bolt retaining tool or clip 12 to hold the cable fixing bolt of a bicycle component in a loosened condition for easy assembly. The bicycle 10 has cable operated components such as a rear derailleur 13, a front derailleur 14 and a pair of brakes 15. The rear and front derailleurs 13 and 14 are operated by shifting units 18 via shift cables 20 in a conventional manner. Likewise, brakes 15 are operated by brake operating devices or levers 22 via brake cables 24 in a conventional manner.

Bicycles and their various components are well known in the art, and thus, bicycle 10 and its various components will not be discussed or illustrated in detail herein except for the components that relate to the present invention. In other words, only derailleurs 13 and 14 and brakes 15 will be briefly discussed and/or illustrated herein as they relate to the present invention.

Figure 2:
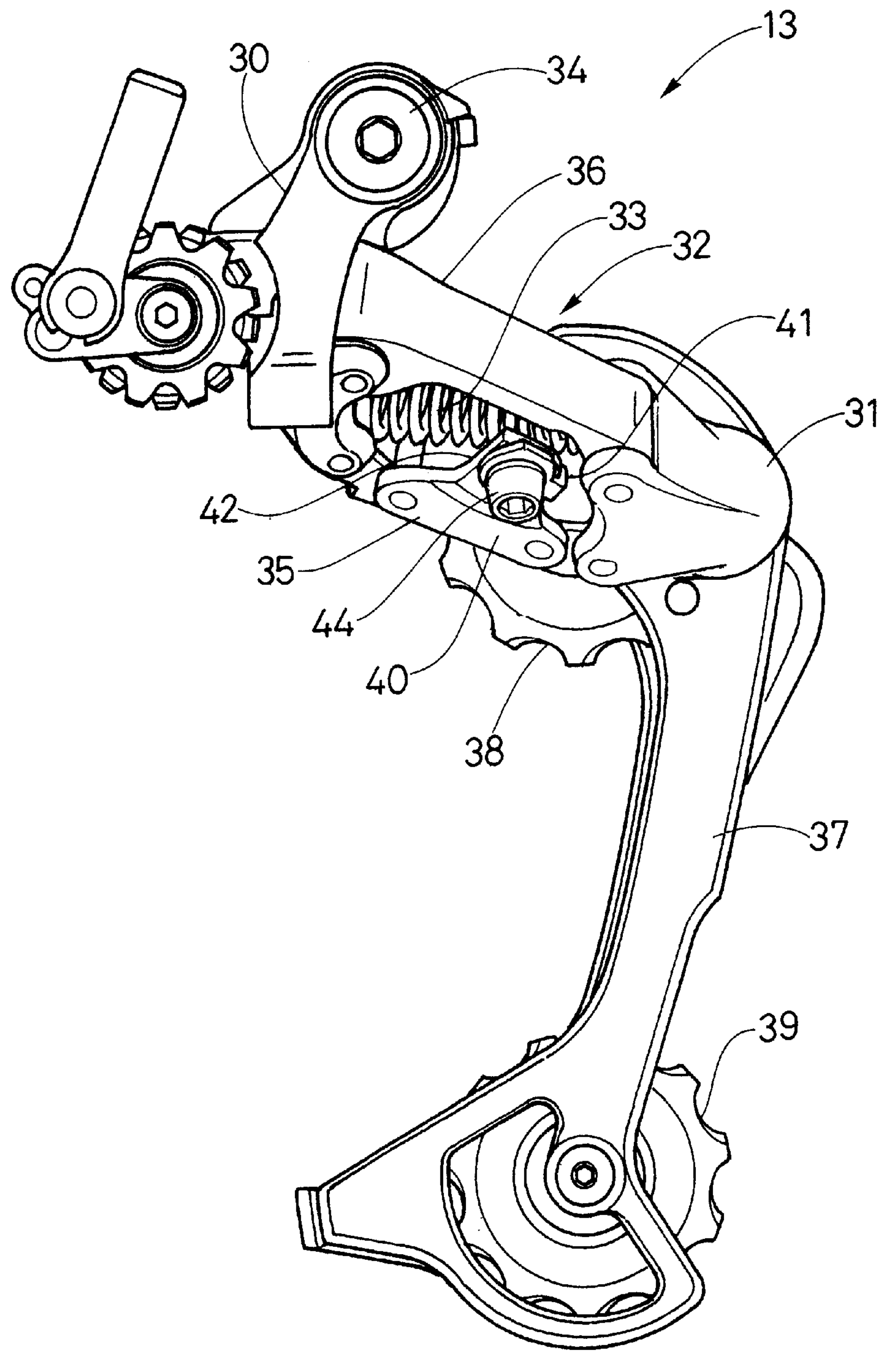
FIG. 2 is a side elevational view of a conventional rear derailleur of the low normal type without a cable fixing bolt retaining tool or clip coupled thereto in accordance with the present invention.
Figure 3:
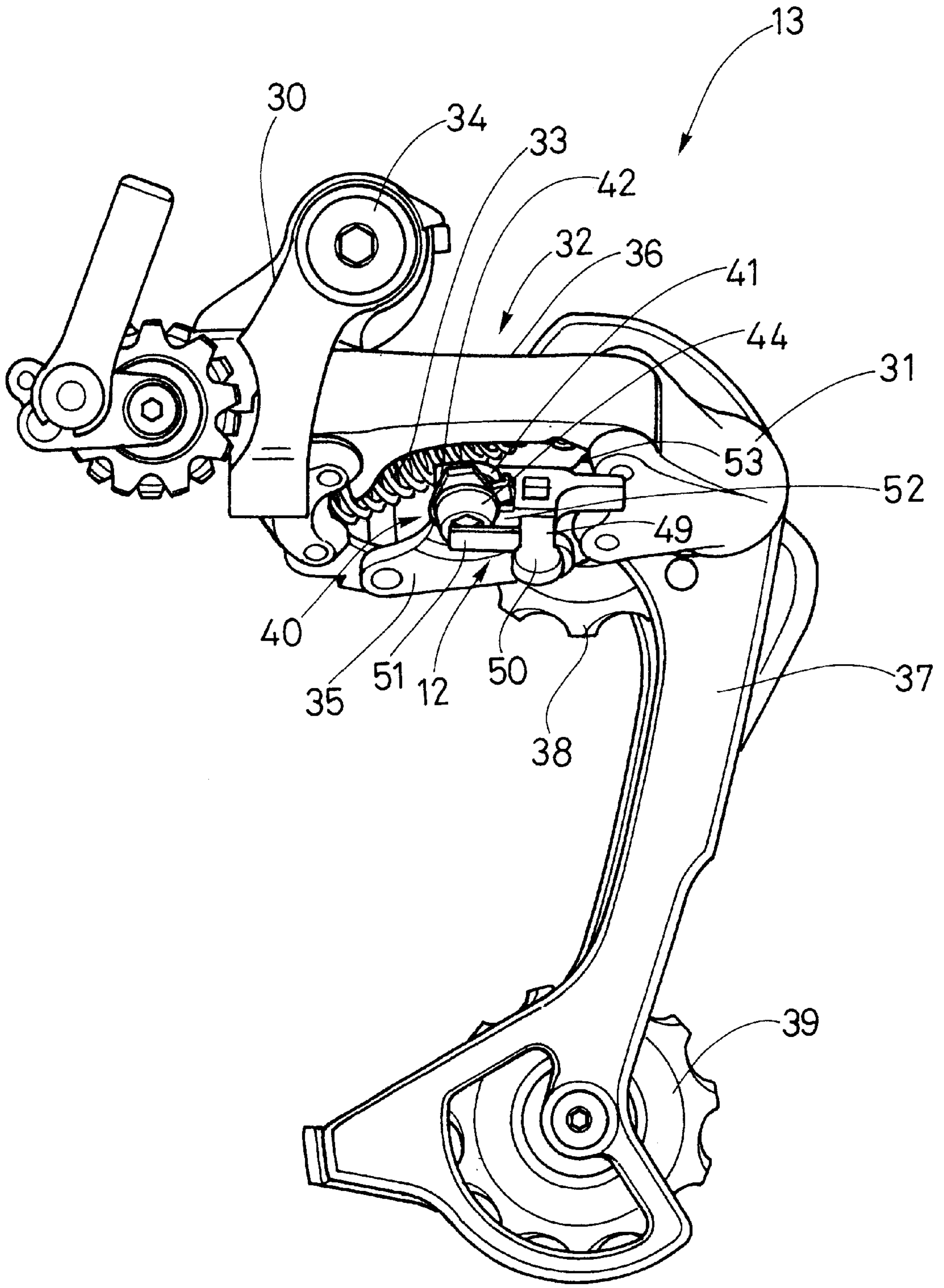
FIG. 3 is a side elevational view of the rear derailleur, in which the cable fixing bolt retaining clip or tool has been coupled thereto in accordance with the present invention.

As best seen in FIGS. 2 and 3, rear derailleut 13 is a low normal type derailleur that is normally biased to the low or large gear of the rear set of gears of bicycle 10. In this embodiment, the cable fixing bolt retaining tool 12 is designed to hold rear derailleur 13 in a more compact position or shipping and storage. More specifically, the cable fixing bolt retaining tool 12 holds the rear derailleur 13 in a top gear position so as to be more compact. Derailleur 13 can be a relatively conventional low normal type derailleur. Thus, rear derailleur 13 will not be discussed or illustrated in detail herein. Rather, rear derailleur 13 will only be briefly discussed in order to understand the use of cable fixing bolt retaining tool 12 therewith. Basically, rear derailleur 13 has a base or fixed member 30, a movable member 31, a linkage assembly 32 and a biasing member or spring 33. The fixed member 30 is coupled to the frame of the bicycle 10 via a conventional bracket axle assembly 34. The linkage assembly 32 has inner and outer links 35 and 36 pivotally coupled at one end to the base member 30 and at the other end to the movable member 31. The biasing member or spring located between the fixed member 30 and the movable member 31 for urging the movable member 31 to a low gear position. Preferably, each of the parts of rear derailleur 13 is constructed of relatively lightweight, rigid materials which are well known in the art. The movable member 31 has a cage 37 pivotally coupled thereto and biased to place the chain of bicycle 10 under tension. The cage 37 has a guide pulley 38 and a tension pulley 39 rotatably coupled thereto.

In this embodiment, the cable fixing bolt 40 is coupled to the actuating arm of the inner link 35 of the linkage assembly 32 with a cable fixing plate 41 located therebetween. More specifically, the inner link 35 has an integral nut portion 42 with a threaded hole for threadedly receiving cable fixing bolt 40 therein. The cable fixing bolt 40 is a relatively conventional cable fixing bolt having a head portion 44 and a shaft portion 45 with threads thereon that extends from the head portion 44 to a free end. The cable fixing plate 41 is movably located on the threaded shaft portion 45 of the cable fixing bolt 40 so as to be located between the head portion 44 of the cable fixing bolt 40 and the nut portion 42 of the inner link 35. While the nut portion 42 is an integral part of the inner link 35 in this embodiment, it will be apparent to those skilled in the art from this disclosure that the inner link 35 can be provided with an unthreaded hole and a separate nut could be utilized. Of course, this is less preferably than the disclosed embodiment, since it will increase the difficulty of installation.

When the shift cable 20 is attached to the inner link 35, the inner wire of the shift cable 20 is located between the nut portion 42 of the inner link 35 and the cable fixing plate 41. Thus, head portion 44 of the cable fixing bolt 40 does not directly engage the inner wire of the shift cable 20.

Cable fixing bolt retaining tool 12 is utilized to hold cable fixing bolt 40 in a loosened condition relative to the inner link 35. This will allow the rear derailleur 13 to be shipped and/or stored with the cable fixing bolt 40 in its loosened condition without the cable fixing bolt 40 becoming separated from the derailleur 13, and thus, being lost. By holding the cable fixing bolt 40 in the loosened condition, installation and coupling of the shift cable 20 to the inner link 35 is expedited. Preferably, cable fixing bolt retaining tool 12 is constructed as a one-piece, unitary member. Preferably, cable fixing bolt retaining tool 12 is constructed of a hard, rigid plastic material that is relatively lightweight and inexpensive. Of course, other suitable materials that do not include these advantages could also be utilized. For example, cable fixing bolt retaining tool 12 can be formed of a reinforced polypropylene, or a polyacetal such as POM, or any other suitable thermoplastic material.

Figure 5:
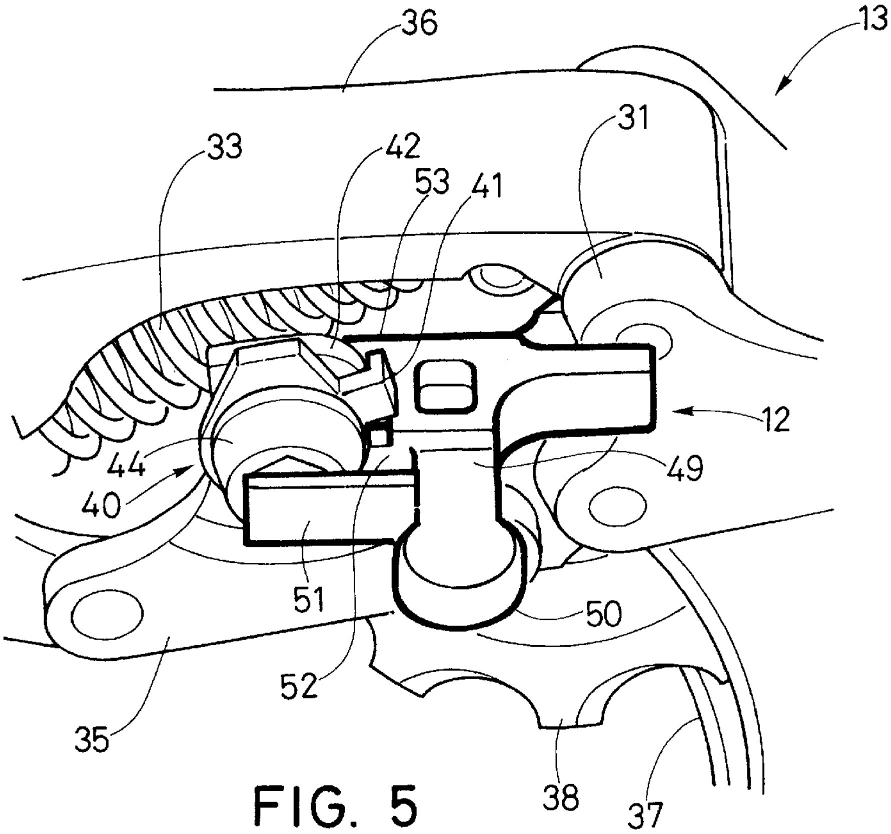
FIG. 5 is an enlarged, partial side elevational view of the rear derailleur illustrated in FIGS. 3–4, in which the cable fixing bolt retaining clip or tool has been coupled thereto in accordance with one embodiment of the present invention.
Figure 6:
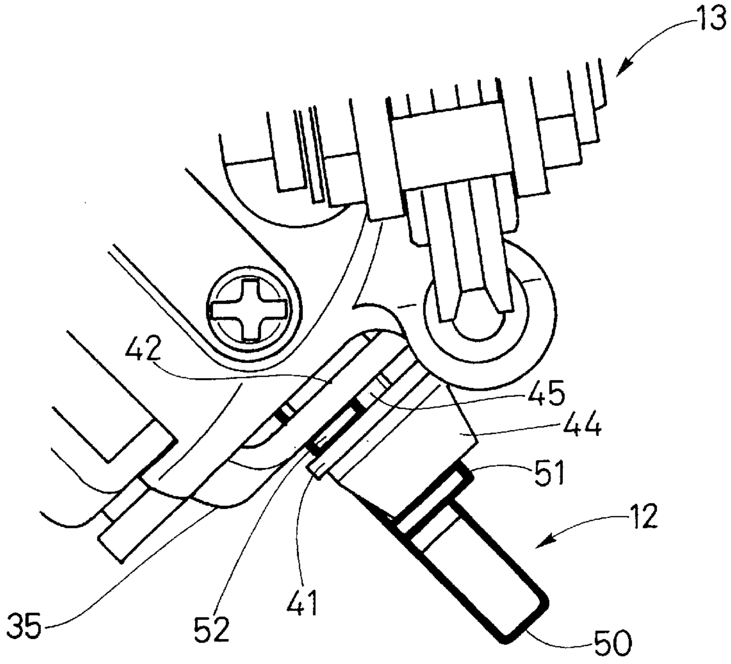
FIG. 6 is an enlarged, partial rear elevational view of the rear derailleur illustrated in FIGS. 3–5, in which the cable fixing bolt retaining clip or tool has been coupled thereto.
Figure 7:
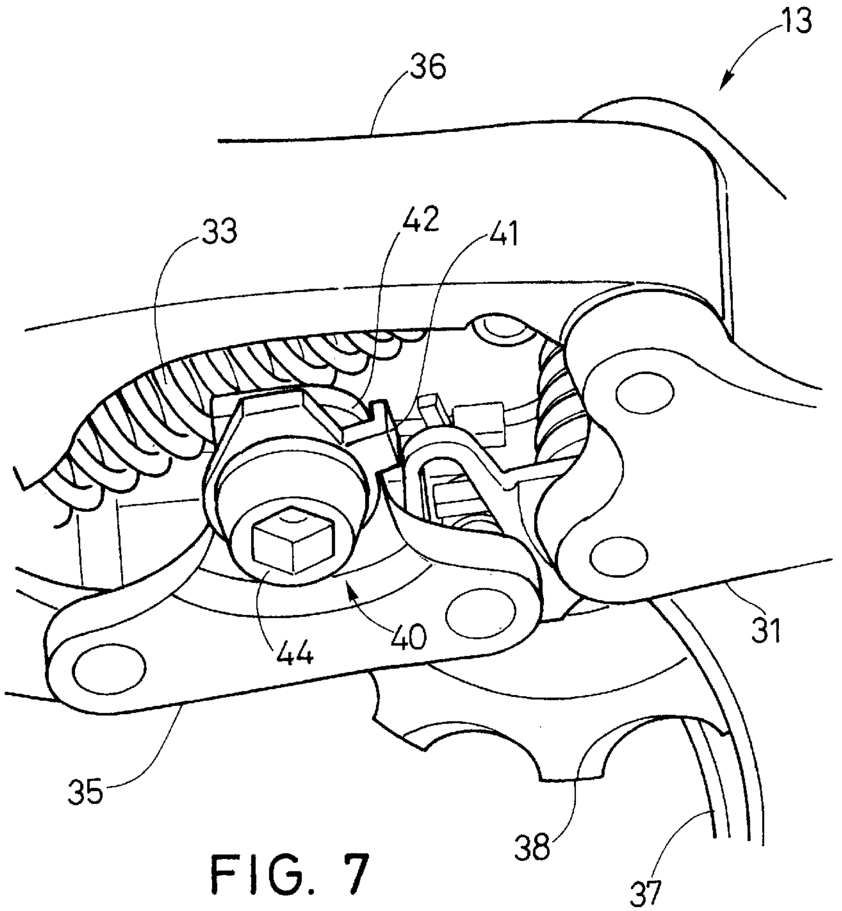
FIG. 7 is an enlarged, partial side elevational view of the rear derailleur illustrated in FIGS. 3–6, in which the cable fixing bolt retaining clip or tool has been removed.
Figure 8:
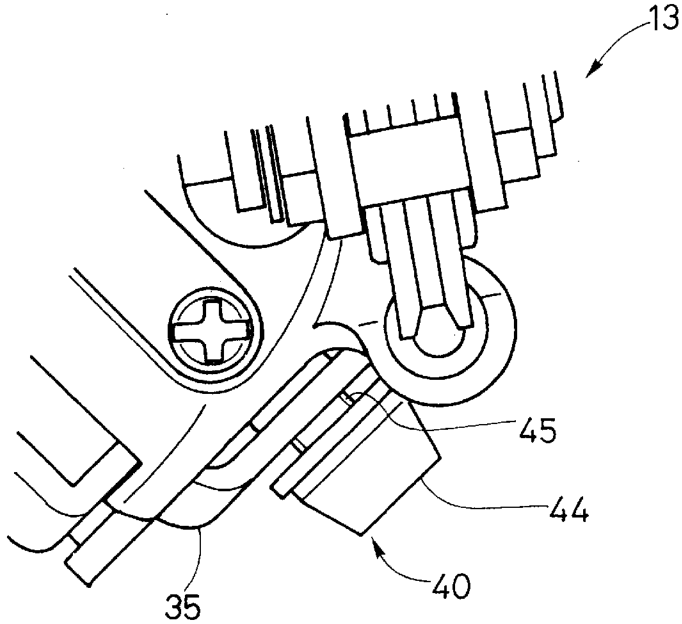
FIG. 8 is an enlarged partial rear elevational view of the rear derailleur in FIGS. 3–7, in which the cable fixing bolt retaining clip or tool has been removed.
Figure 9:
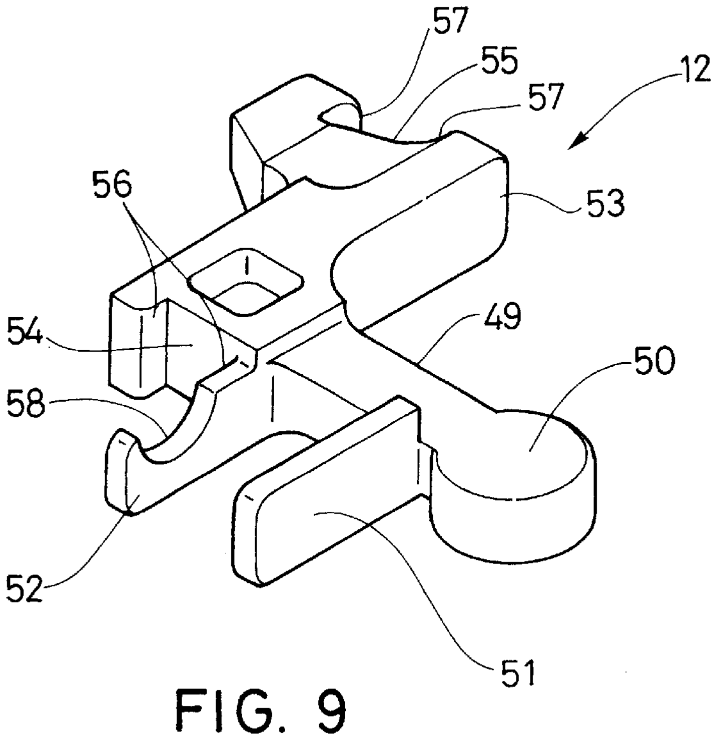
FIG. 9 is a perspective view of the cable fixing bolt retaining clip or tool utilized with the rear derailleur illustrated in FIGS. 3–8.

Basically, as seen in FIGS. 5, 6 and 9, cable fixing bolt retaining tool 12 includes a body portion 49, a gripping portion 50 and three bolt retaining portions 51, 52 and 53 extending from the body portion 49. The three bolt retaining portions 51, 52 and 53 hold the cable fixing bolt 40 in a loosened condition. In this embodiment, the first bolt retaining portion 51 engages the head portion 44 of the cable fixing bolt 40. The second bolt retaining portion 52 is located adjacent the threaded shaft portion 45 of the cable fixing bolt 40. The third bolt retaining portion 53 is located between the nut portion 42 of the inner link 35 and the movable member 31 of the derailleur 13. In this embodiment, the third bolt retaining portion 53 does not only hold the cable fixing bolt 40 in a loosened condition, but it also holds the rear derailleur 13 in a top gear position or a more compact position against the force of the biasing member or spring 33.

As best seen in FIG. 9, the first and second bolt retaining portions 51 and 52 of the cable fixing bolt retaining tool 12 extend substantially perpendicular to the body portion 49 and are substantially parallel to each other. The first and second retaining portions 51 and 52 are preferably spaced apart from each other by a distance corresponding to the axial length of the head portion 44 of the cable fixing bolt 40 and the thickness of the cable fixing plate 41 as seen in FIGS. 5 and 6. Accordingly, when the cable fixing bolt retaining tool 12 is installed on the derailleur 13, the head portion 44 of the cable fixing bolt 40 and the cable fixing plate 41 are located between the first and second bolt retaining portions 51 and 52. Alternatively, it will be apparent to those skilled in the art from this disclosure that the cable fixing plate 41 could be located on the opposite side of the second bolt retaining portion 52, if needed and/or desired. In this alternate possibility, the spacing between the first and second bolt retaining portions 51 and 52 would be reduced to the axial length or thickness of the head portion 44 of the cable fixing bolt 40.

In this embodiment of the cable fixing bolt retaining tool 12, the third bolt retaining portion 53 has a pair of notches 54 and 55 that receive the nut portion 42 of the inner link 35 and the movable member 31, respectively. Accordingly, when the inner link 35 and movable member 31 are positioned within the notches 54 and 55 of the third bolt retaining portion 53, the cable fixing bolt retaining tool 12 is securely fastened to the rear derailleur 13. More specifically, the biasing member or spring 33 applies a pair of opposing forces on the third bolt retaining portion 53 to secure cable fixing bolt retaining tool 12 to derailleur 13. The cable fixing bolt retaining tool 12 is installed by moving the linkage assembly 32 against the force of the biasing spring 33 such that it moves from a low gear position to a top gear position. This movement will cause the space between the movable member 31 and the inner link 35 at the nut portion 42 to be increased.

Now, the cable fixing bolt retaining tool 12 can be inserted between the nut portion 42 of the inner link 35 and the movable member 31 such that the first notch 54 of the third bolt retaining portion 53 engages the nut portion 42 of the inner link 35 and the second notch 55 of the third bolt retaining portion 53 engages the movable member 31. Upon releasing the linkage assembly 32, the spring 33 will urge the movable member 31 towards the nut portion 42 of the inner link 35. However, movements of the movable member 31 and linkage assembly 32 are limited by the third bolt retaining portion 53. The notches 54 and 55 of the third bolt retaining portion 53 have a pair of opposed abutment surfaces 56 and 57, respectively, that limit any movement in a direction that is parallel to the longitudinal axis of the threaded shaft portion 45 of the cable fixing bolt 40. This arrangement ensures that the cable fixing bolt retaining tool 12 does not accidentally disengage from the derailleur 13, and thus, this arrangement prevents the cable fixing bolt 40 to fall out.

Figure 4:
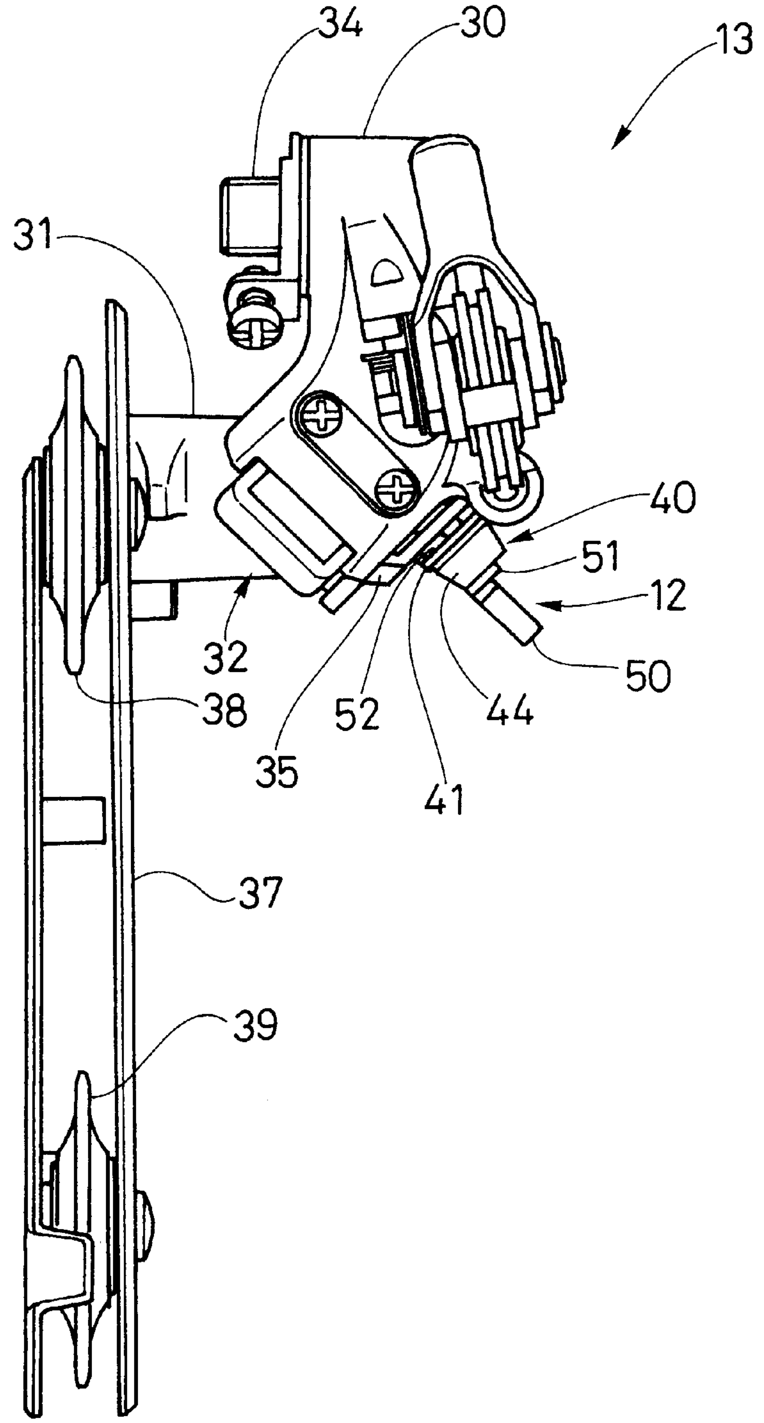
FIG. 4 is a rear elevational view of the rear derailleur illustrated in FIG. 3, in which the cable fixing bolt retaining clip or tool has been coupled thereto in accordance with the present invention.

As seen in FIG. 2, when the cable fixing bolt retaining tool 12 is not installed in the rear derailleur 13, the rear derailleur 13 is in an extended position and takes up a lot of space. This is because the rear derailleur 13 is a low normal type rear derailleur, in which the guide pulley 38 is normally biased to hold the chain on the low or large gear of the rear set of gears of the bicycle 10. In other words, the spring 33 of the rear derailleur 13 normally holds the rear derailleur 13 in an extended position. Thus, the low normal type rear derailleur 13 requires a larger box for shipping in an extended position. In order to reduce the size of a low normal type derailleur for shipping, the cable fixing bolt retaining tool 12 holds the low normal type derailleur 13 in its retracted position as seen in FIGS. 3 and 4. In other words, the cable fixing bolt retaining tool 12 is designed to hold the rear derailleur 13 in a more compact position or shipping and storage. Specifically, the third bolt retaining portion 53 of the cable fixing bolt retaining tool 12 is located between the movable member 31 and the inner link 35 to hold the spring 33 of the linkage assembly 32 in a compressed or retracted position. Thus, the cable fixing bolt retaining tool 12 holds the rear derailleur in a top gear position so as to be more compact. By using the cable fixing bolt retaining tool 12, the low normal type derailleur 13 can be shipped in a smaller package.

Figure 10:
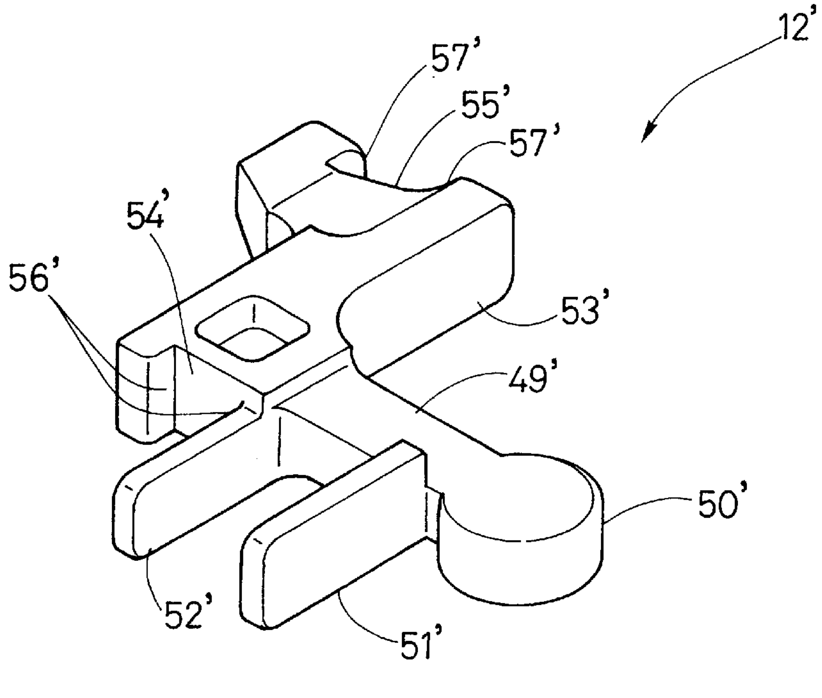
FIG. 10 is a perspective view of an alternate embodiment of a cable fixing bolt retaining clip or tool to be used with the rear derailleur illustrated in FIGS. 3–8 in accordance with another embodiment of the present invention.

As seen in FIG. 9, the second bolt retaining portion 52 is preferably provided with a recess or notch 58 that allows the second retaining portion 52 to partially surround the threaded shaft portion 45 of the cable fixing bolt 40. This notch or recess 58 of the second bolt retaining portion 52 also allows the first bolt retaining portion 51 to more firmly and completely engage the head portion 44 of the cable fixing bolt 40. Of course, as seen in FIG. 10, a slightly modified cable fixing bolt retaining tool 12' is illustrated in which the notch or recess of the second bolt retaining portion has been eliminated. This modified cable fixing bolt retaining tool 12' is otherwise identical to the cable fixing bolt retaining tool 12 discussed above. Therefore, the same reference numerals will be utilized to indicate the identical or substantially identical portions, but with a prime. In other words, cable fixing bolt retaining tool 12' includes a body portion 49', a gripping portion 50' and three bolt retaining portions 51', 52' and 53'.

SECOND EMBODIMENT

Referring now to FIGS. 11–18, a cable fixing bolt retaining tool 112 in accordance with a second embodiment of the present invention is illustrated for use with a modified rear derailleur 113 to be mounted on bicycle 10. This embodiment is similar to the first embodiment, discussed above, except that the cable fixing bolt retaining tool 112 of this embodiment does not include the shipping and storage feature of the first embodiment and the cable fixing bolt 140 has been modified.

Figure 11:
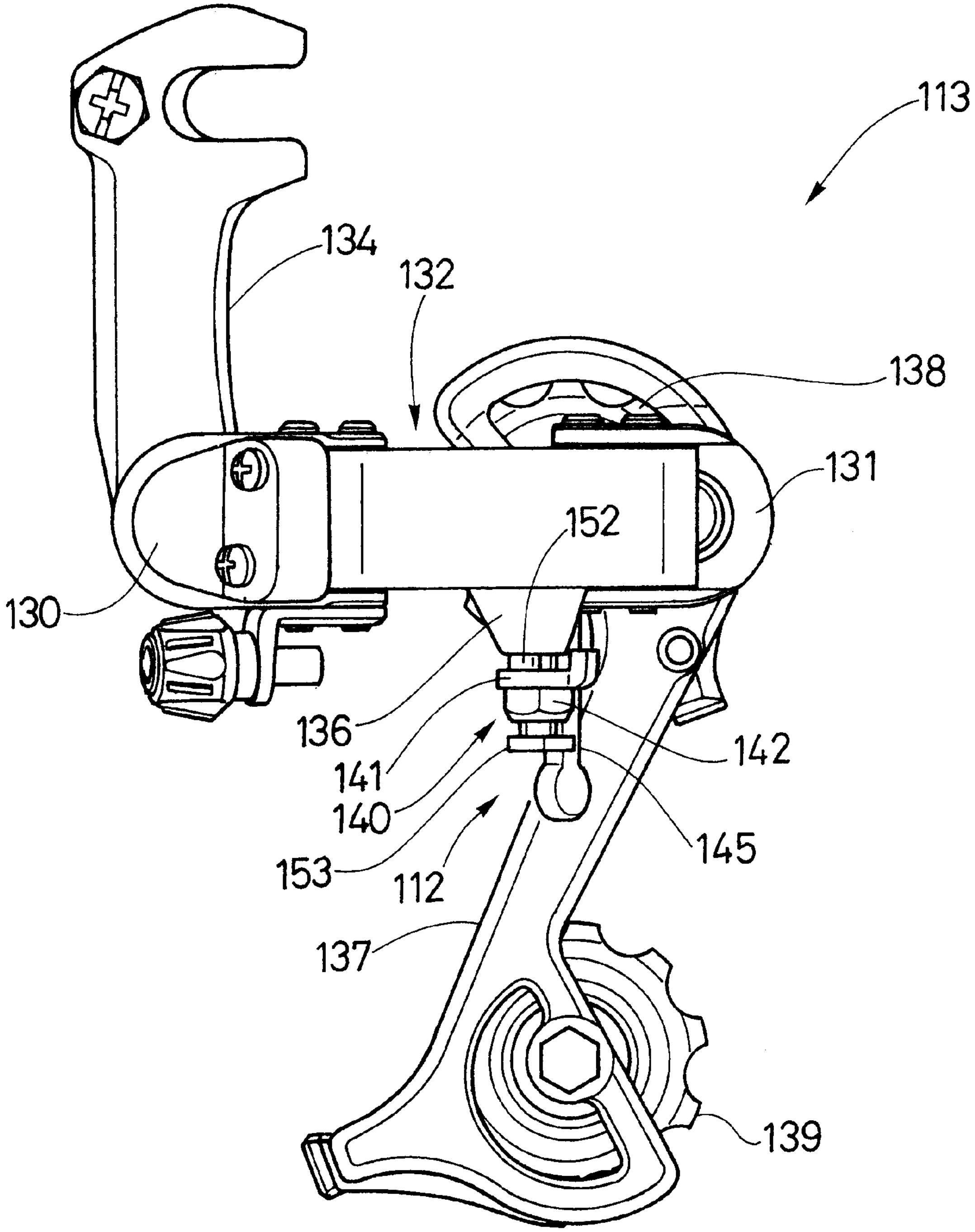
FIG. 11 is a side elevational view of an alternate embodiment of a rear derailleur and an alternate embodiment of a cable fixing bolt retaining clip or tool coupled thereto in accordance with another embodiment of the present invention.
Figure 12:
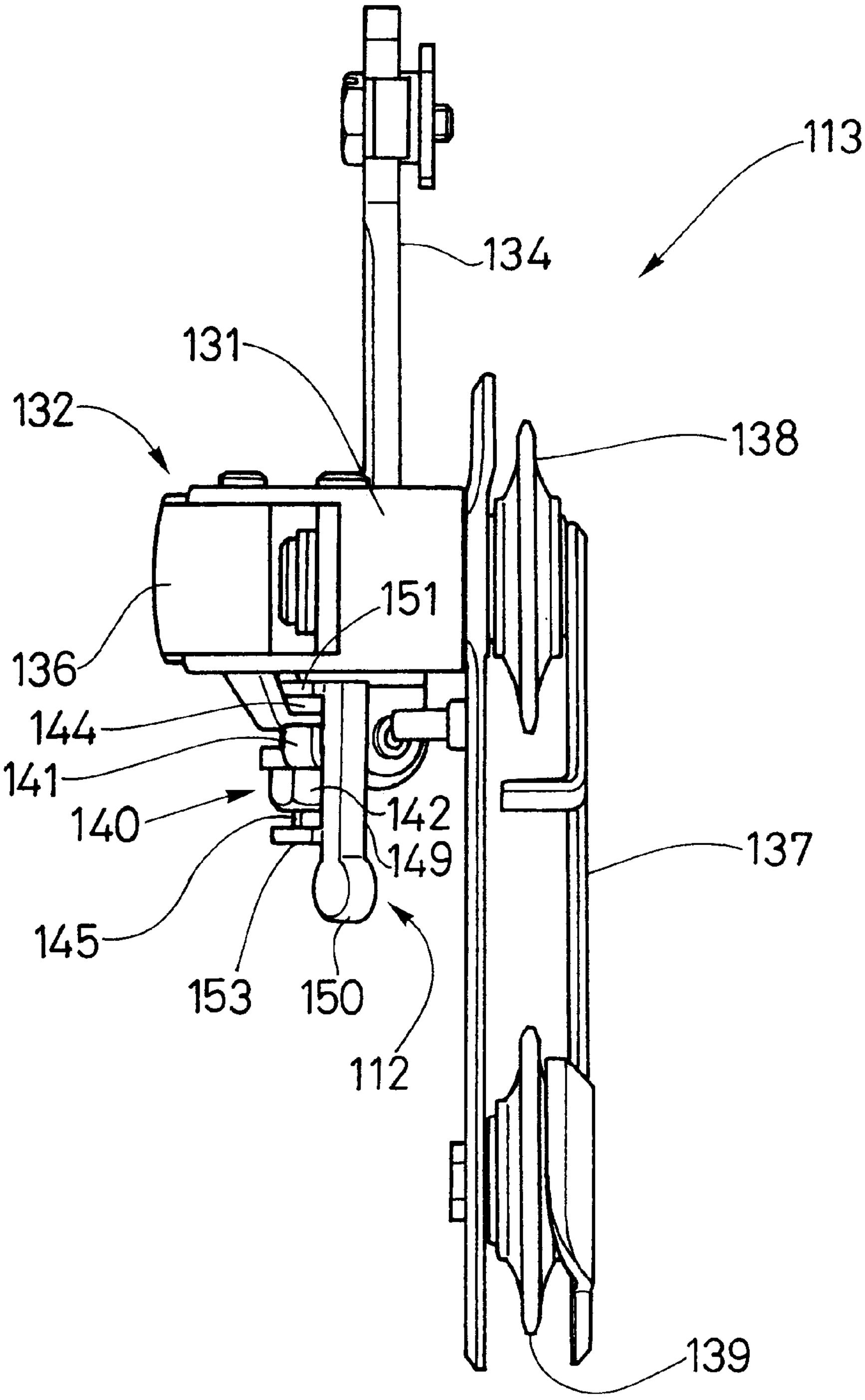
FIG. 12 is a rear elevational view of the alternate rear derailleur and the cable fixing bolt retaining clip or tool illustrated in FIG. 11.

As best seen in FIGS. 11 and 12, rear derailleur 113 is a top normal type derailleur that is normally biased to the top or small gear of the rear set of gears of bicycle 10. Derailleur 113 can be a relatively conventional top normal type derailleur. Thus, rear derailleur 113 will not be discussed or illustrated in detail herein. Rather, rear derailleur 113 will only be briefly discussed in order to understand the use of cable fixing bolt retaining tool 112 therewith.

Basically, rear derailleur 113 has a base or fixed member 130, a movable member 131, a linkage assembly 132 and a biasing member or spring (not shown). The fixed member 130 is coupled to the frame of the bicycle 10 via a conventional bracket axle assembly 134. The linkage assembly 132 has an inner link (not shown) and an outer link 136 pivotally coupled at one end to the base member 130 and at the other end to the movable member 131. The biasing member or spring located between the fixed member 130 and the movable member 131 for urging the movable member 131 to a top gear position. Preferably, each of the parts of rear derailleur 113 is constructed of relatively lightweight, rigid materials which are well known in the art. The movable member 131 has a cage 137 pivotally coupled thereto and biased to place the chain of bicycle 10 under tension. The cage 137 has a guide pulley 138 and a tension pulley 139 rotatably coupled thereto.

In this embodiment, the cable fixing bolt 140 is located in an unthreaded hole of the outer link 136 of the linkage assembly 132 with a cable fixing plate 141 located between the outer link 136 and nut 142. More specifically, the outer link 136 has a non-circular hole for engaging a corresponding part of the cable fixing bolt 140 to prevent relative rotation therebetween. The cable fixing bolt 140 is a relatively conventional cable fixing bolt having a head portion 144 and a threaded shaft portion 145 extending from the head portion 144 to a free end. The nut 142 has a threaded hole for threadedly receiving cable fixing bolt 140 therein. The cable fixing plate 141 is movably located on the threaded shaft portion 145 of the cable fixing bolt 140 so as to be located between the nut and the outer link 136.

When the shift cable 20 is attached to the outer link 136, the inner wire of the shift cable 20 is located between the outer surface of the outer link 136 and the cable fixing plate 141. Thus, the nut 142 on the shaft portion 145 of the cable fixing bolt 140 does not directly engage the inner wire of the shift cable 20.

Cable fixing bolt retaining tool 112 is utilized to hold cable fixing bolt 140 in a loosened condition relative to the outer link 136. This will allow the rear derailleur 113 to be shipped and/or stored with the cable fixing bolt 140 in its loosened condition without the cable fixing bolt 140 becoming separated from the derailleur 113, and thus, being lost. By holding the cable fixing bolt 140 in the loosened condition, installation and coupling of the shift cable 20 to the outer link 136 is expedited. Preferably, cable fixing bolt retaining tool 112 is constructed as a one-piece, unitary member. Preferably, cable fixing bolt retaining tool 112 is constructed of a hard, rigid plastic material that is relatively lightweight and inexpensive. Of course, other suitable materials that do not include these advantages could also be utilized.

Figure 17:
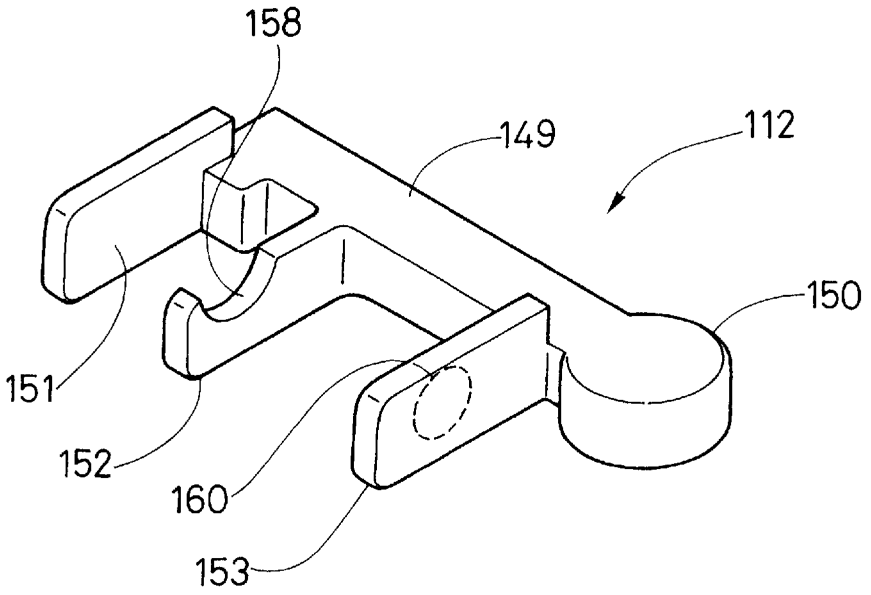
FIG. 17 is a perspective view of the cable fixing bolt retaining clip or tool utilized with the rear derailleur illustrated in FIGS. 11–16.

Basically, as seen in FIG. 17, cable fixing bolt retaining tool 112 includes a body portion 149, a gripping portion 150 and three bolt retaining portions 151, 152 and 153 extending from the body portion 149. The three bolt retaining portions 151, 152 and 153 hold the cable fixing bolt 140 in a loosened condition. In this embodiment, the first bolt retaining portion 151 engages the head portion 144 of the cable fixing bolt 140. The second bolt retaining portion 152 is located adjacent the threaded shaft portion 145 of the cable fixing bolt 140. The third bolt retaining portion 153 engages the free end of the threaded shaft portion 145 of the cable fixing bolt 140.

Figure 13:
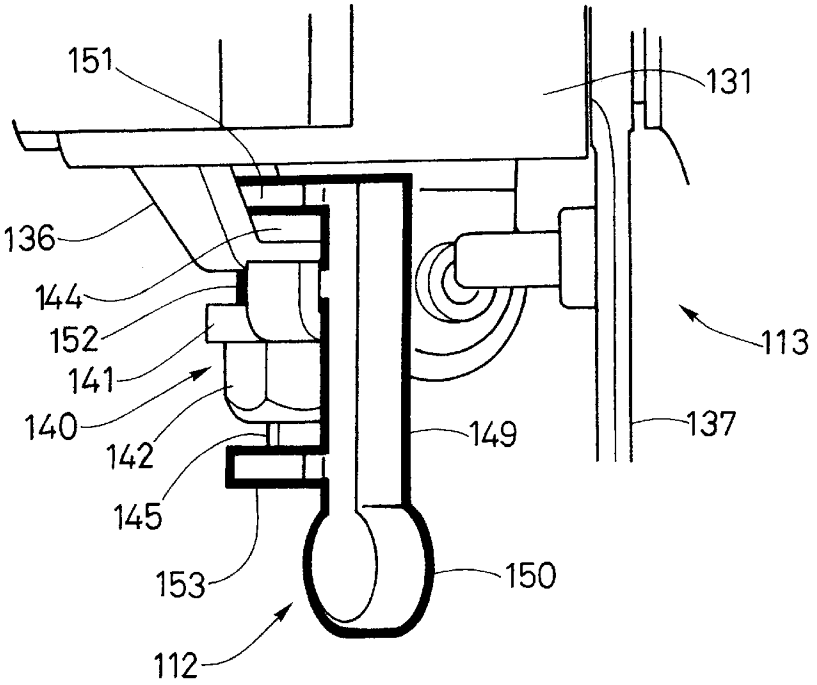
FIG. 13 is an enlarged, partial side elevational view of the rear derailleur illustrated in FIGS. 11 and 12, in which the cable fixing bolt retaining clip or tool has been coupled thereto in accordance with one embodiment of the present invention.
Figure 14:
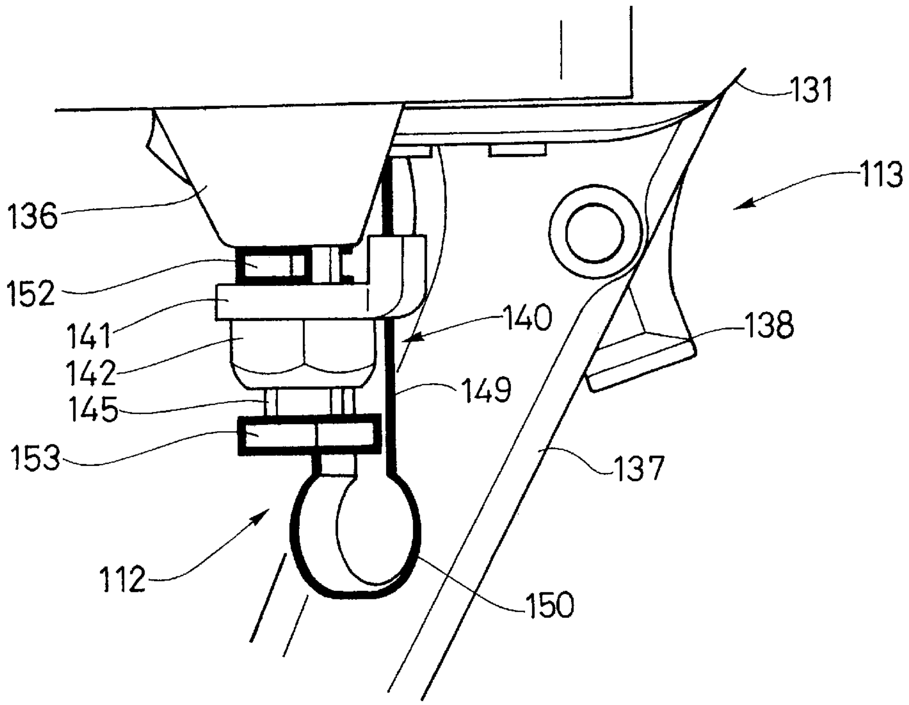
FIG. 14 is an enlarged, partial rear elevational view of the rear derailleur illustrated in FIGS. 11 and 12, in which the cable fixing bolt retaining clip or tool has been coupled thereto.
Figure 15:
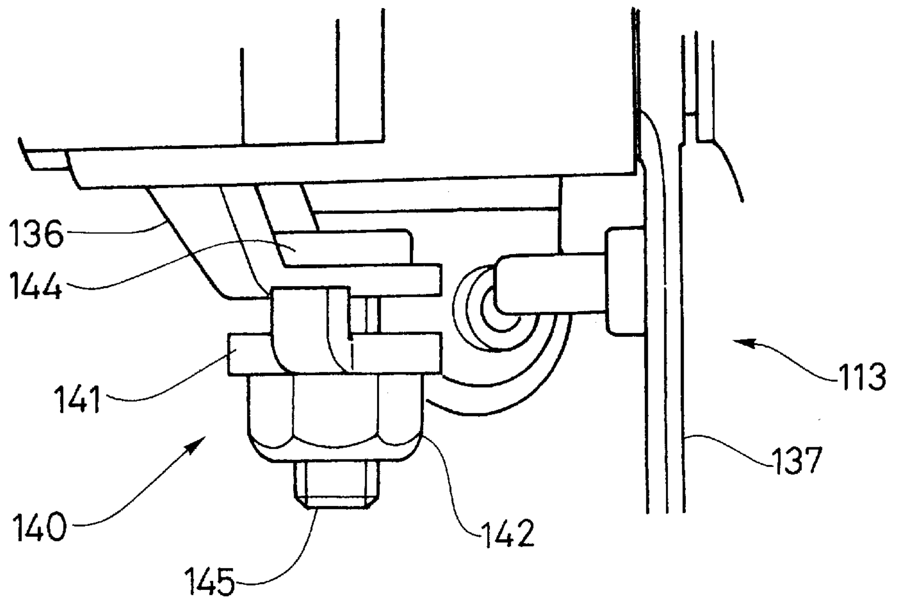
FIG. 15 is an enlarged, partial side elevational view of the rear derailleur illustrated in FIGS. 11–14, in which the cable fixing bolt retaining clip or tool has been removed.
Figure 16:
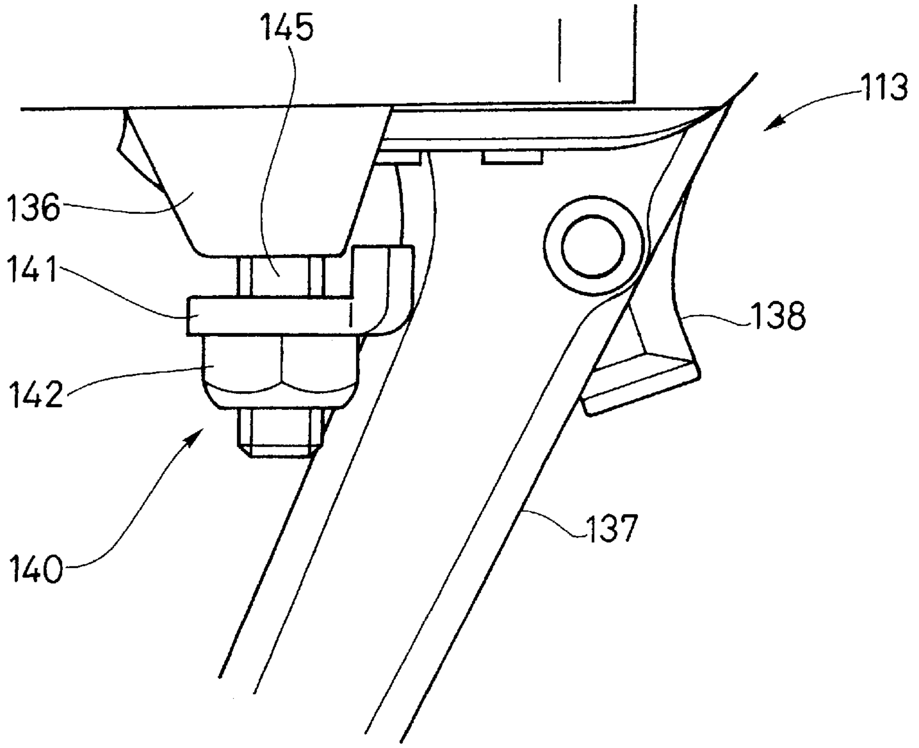
FIG. 16 is an enlarged partial rear elevational view of the rear derailleur in FIGS. 11–15, in which the cable fixing bolt retaining clip or tool has been removed.

As best seen in FIG. 17, the first, second and third bolt retaining portions 151, 152 and 153 of the cable fixing bolt retaining tool 112 extend substantially perpendicular to the body portion 149 and are substantially parallel to each other. The first and second retaining portions 151 and 152 are preferably spaced apart from each other by a distance corresponding to the axial length of the head portion 144 of the cable fixing bolt 140 and the thickness of the outer link 136 as seen in FIGS. 13 and 14. Accordingly, when the cable fixing bolt retaining tool 112 is installed on the derailleur 113, the head portion 144 of the cable fixing bolt 140 and a portion of the outer link 136 are located between the first and second bolt retaining portions 151 and 152. Alternatively, it will be apparent to those skilled in the art from this disclosure that the cable fixing plate 141 could be located between the first and second bolt retaining portions 151 and 152, if needed and/or desired. In this alternate possibility, the spacing between the first and second bolt retaining portions 151 and 152 would be increased to the axial length or thickness of cable fixing plate 141.

Figure 18:
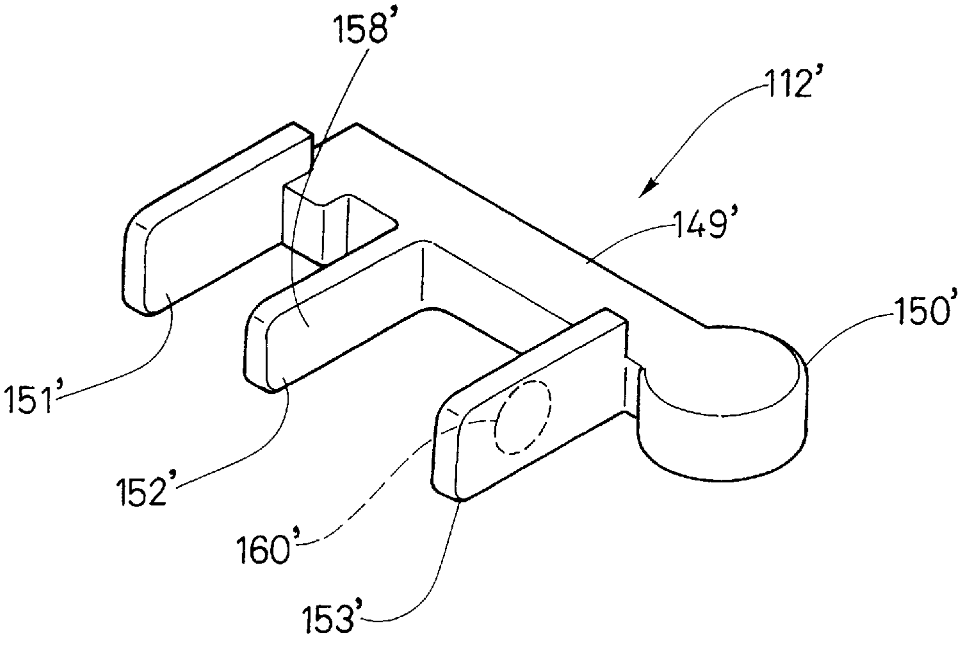
FIG. 18 is a perspective view of an alternate embodiment of a cable fixing bolt retaining clip or tool to be used with the rear derailleur illustrated in FIGS. 11–16 in accordance with another embodiment of the present invention.

As seen in FIG. 17, the second bolt retaining portion 152 is preferably provided with a recess or notch 158 that allows the second retaining portion 152 to partially surround the threaded shaft portion 145 of the cable fixing bolt 140. This notch or recess 158 of the second bolt retaining portion 152 also allows the first bolt retaining portion 151 to more firmly and completely engage the head portion 144 of the cable fixing bolt 140. Of course, as seen in FIG. 18, a slightly modified cable fixing bolt retaining tool 112' is illustrated in which the notch or recess of the second bolt retaining portion has been eliminated. This modified cable fixing bolt retaining tool 112' is otherwise identical to the cable fixing bolt retaining tool 112 discussed above. Therefore, the same reference numerals will be utilized to indicate the identical or substantially identical portions, but with a prine. In other words, cable fixing bolt retaining tool 112' includes a body portion 149', a gripping portion 150' and three bolt retaining portions 151', 152' and 153'.

Referring again to FIG. 17, the third bolt retaining portion 153 is preferably provided with a concavity or bore 160. The free end of threaded shaft portion 145 of the cable fixing bolt 140 is preferably received within the concavity or bore 160. In this preferred embodiment, the concavity or bore 160 is a blind bore. Of course, it will be apparent to those skilled in the art from this disclosure that bore 160 can be a through bore, if needed and/or desired.

THIRD EMBODIMENT

Referring now to FIGS. 19–22, a cable fixing bolt retaining tool or clip 212 in accordance with a third embodiment of the present invention is illustrated on the derailleur 113 of FIGS. 11–16. This embodiment is similar to the second embodiment, discussed above, except that a modified cable fixing bolt 240 is being used with derailleur 113 and the cable fixing bolt retaining tool 212 has been modified to accommodate the new cable fixing bolt arrangement.

In this embodiment, the cable fixing bolt 240 is reversed from the second embodiment such that the nut 242 contacts the outer link 136 of derailleur 113. The fixing bolt 240 has a head portion 244 and a threaded shaft portion 245 extending from the head portion 244 to a free end. The nut 242 has a threaded hole for threadedly receiving the threaded shaft portion 245 of cable fixing bolt 240 therein. The cable fixing plate 241 is movably located on the threaded shaft portion 245 of the cable fixing bolt 240 so as to be located between the head portion 244 and the outer link 136. The nut 242 can be either removably coupled to the outer link 136 or integrally formed as part of the outer link in this embodiment. In either case, the nut 242 preferably does not rotate relative to outer link 136. If the nut 242 is a separate part from the outer link 136, as illustrated in this embodiment, then the nut 242 should engage an inner surface of outer link 136 to prevent rotation of the nut 242 during tightening of the cable fixing bolt 240.

Figure 21:
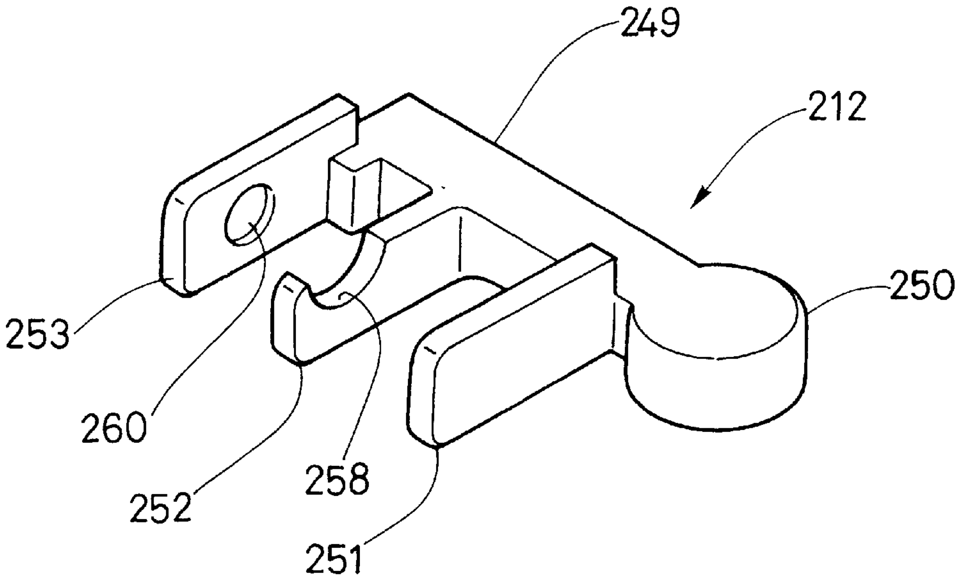
FIG. 21 is a perspective view of the cable fixing bolt retaining clip or tool to be utilized with the rear derailleur illustrated in FIGS. 19 and 20.

Basically, as seen in FIG. 21, the cable fixing bolt retaining tool 212 includes a body portion 249, a gripping portion 250 and three bolt retaining portions 251, 252 and 253 extending from the body portion 249. The three bolt retaining portions 251, 252 and 253 hold the cable fixing bolt 240 in a loosened condition. In this embodiment, the first bolt retaining portion 251 engages the head portion 244 of the cable fixing bolt 240. The second bolt retaining portion 252 is located adjacent the threaded shaft portion 245 of the cable fixing bolt 240. The third bolt retaining portion 253 engages the free end of the threaded shaft portion 245 of the cable fixing bolt 240.

Figure 19:
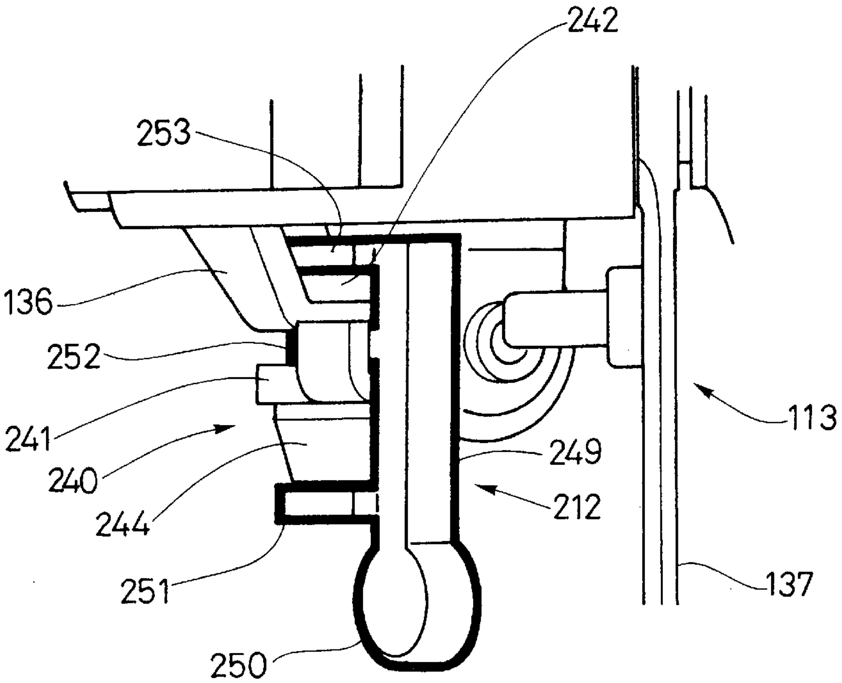
FIG. 19 is an enlarged, partial side elevational view of the rear derailleur illustrated in FIGS. 11–16, in which a modified cable fixing bolt retaining clip or tool has been coupled thereto in accordance with one embodiment of the present invention.
Figure 20:
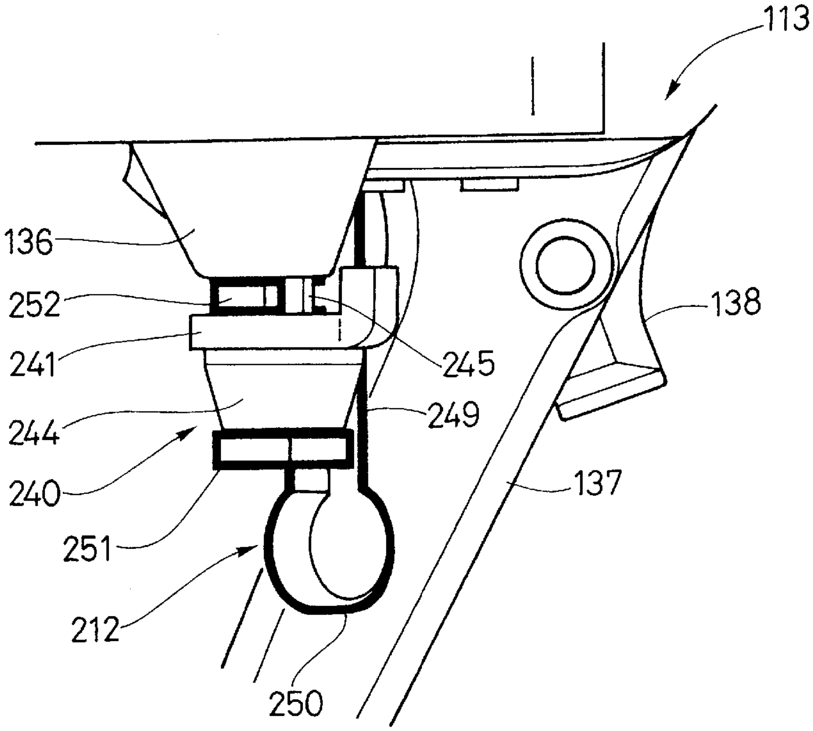
FIG. 20 is an enlarged, partial rear elevational view of the rear derailleur illustrated in FIGS. 11–16, in which a modified cable fixing bolt retaining clip or tool has been coupled thereto.

As best seen in FIG. 21, the first, second and third bolt retaining portions 251, 252 and 253 of the cable fixing bolt retaining tool 212 extend substantially perpendicular to the body portion 249 and are substantially parallel to each other. The first and second retaining portions 251 and 252 are preferably spaced apart from each other by a distance corresponding to the axial length of the head portion 244 of the cable fixing bolt 240 and the thickness of the cable finding plate 241 as seen in FIGS. 19 and 20. Accordingly, when the cable fixing bolt retaining tool 212 is installed on the derailleur 113, the head portion 244 of the cable fixing bolt 240 and the cable fixing plate 241 are located between the first and second bolt retaining portions 251 and 252. Alternatively, it will be apparent to those skilled in the art from this disclosure that the cable fixing plate 241 could be located on the opposite side of the second bolt retaining portion 252, if needed and/or desired. In this alternate possibility, the spacing between the first and second bolt retaining portions 251 and 252 would be reduced to the axial length or thickness of the head portion 244 of the cable fixing bolt 240.

Referring again to FIG. 21, the third bolt retaining portion 253 is preferably provided with a concavity or bore 260. The free end of threaded shaft portion 245 of the cable fixing bolt 240 is preferably received within the concavity or bore 260. In this preferred embodiment, the concavity or bore 260 is a blind bore. Of course, it will be apparent to those skilled in the art from this disclosure that bore 260 can be a through bore, if needed and/or desired.

Figure 22:
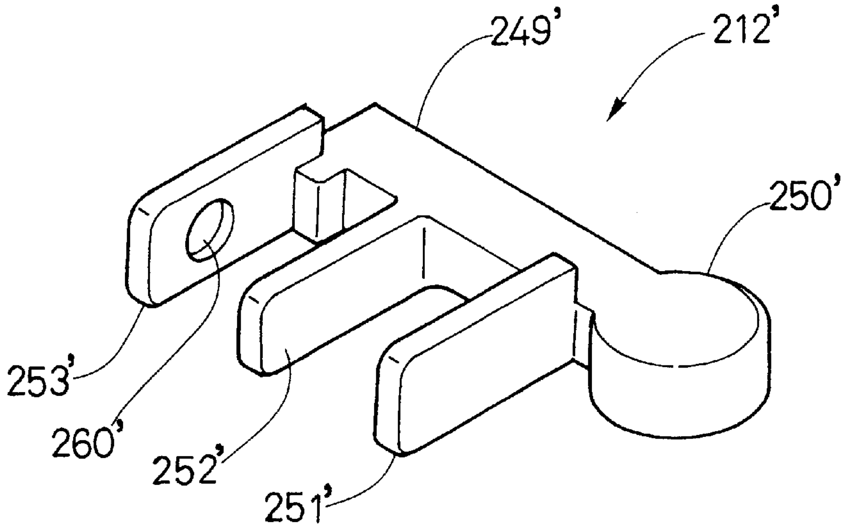
FIG. 22 is a perspective view of an alternate embodiment of a cable fixing bolt retaining clip or tool to be used with the rear derailleur illustrated in FIGS. 19–20 in accordance with another embodiment of the present invention.

As seen in FIG. 21, the second bolt retaining portion 252 is preferably provided with a recess or notch 258 that allows the second retaining portion 252 to partially surround the threaded shaft portion 245 of the cable fixing bolt 240. This notch or recess 258 of the second bolt retaining portion 252 also allows the first bolt retaining portion 251 to more firmly and completely engage the head portion 244 of the cable fixing bolt 240. Of course, as seen in FIG. 22, a slightly modified cable fixing bolt retaining tool 212' is illustrated in which the notch or recess of the second bolt retaining portion has been eliminated This modified cable fixing bolt retaining tool 212' is otherwise identical to the cable fixing bolt retaining tool 212 discussed above. Therefore, the same reference numerals will be utilized to indicate the identical or substantially identical portions, but with a prime. In other words, cable fixing bolt retaining tool 212' includes a body portion 249', a gripping portion 250' and three bolt retaining portions 251', 252' and 253'.

FOURTH EMBODIMENT

Referring now to FIGS. 23–28, a fourth embodiment of a cable fixing bolt retaining tool or clip 312 in accordance with the present invention is illustrated as being used with the front derailleur 14. This embodiment is similar to the second and third embodiments, discussed above, except that the cable fixing bolt retaining tool 312 has been modified for the cable fixing bolt 340 of the front derailleur 14.

Generally, front derailleur 14 includes a fixed member 330 non-movably secured to a bicycle frame, a movable member 331 supported to be movable relative to the fixed member 330 by a linkage assembly 332 and a biasing member or spring 333. The movable member 331 is in the form of a chain guide having a pair of vertical plates 338 and 339 for contacting a chain. The movable member 331 is movable relative to the fixed member 330 by pulling a shift cable 20. The movable member 331 and fixed member 330 are usually interconnected through pivotal links 335 and 336. The shift cable 20 is connected to the outer link 336 to apply a torque thereto, thereby causing the links 335 and 336 to move the movable member 331. The shift cable 20 is fixed to the actuating arm 337 of the outer link 336 by a cable fixing bolt 340 and a nut 342. The cable fixing bolt 340 has a head portion 344 and a shaft portion 345 with a threaded section and a non-threaded section.

Figure 29:
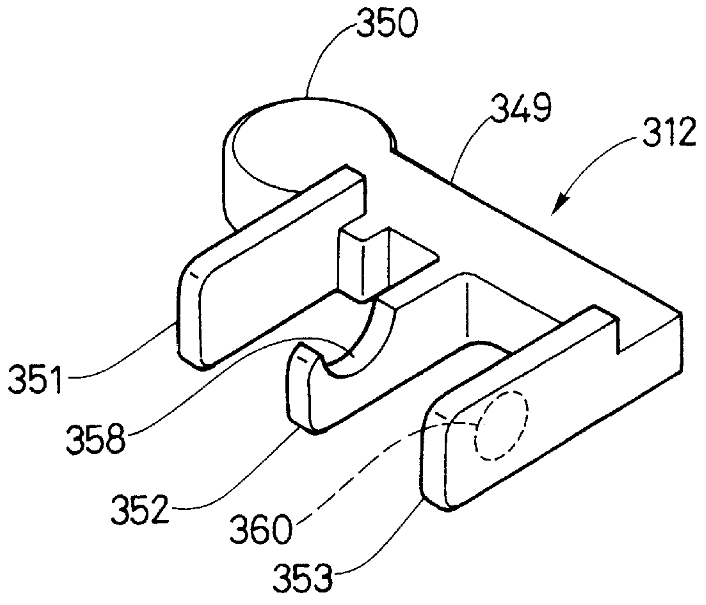
FIG. 29 is a perspective view of the cable fixing bolt retaining clip or tool utilized with the front derailleur illustrated in FIGS. 23–26.

Basically, as seen in FIG. 29, cable fixing bolt retaining tool 312 includes a body portion 349, a gripping portion 350 and three bolt retaining portions 351, 352 and 353 extending from the body portion 349. The three bolt retaining portions 351, 352 and 353 hold the cable fixing bolt 340 in a loosened condition. In this embodiment, the first bolt retaining portion 351 engages the head portion 344 of the cable fixing bolt 340. The second bolt retaining portion 352 is located adjacent the head portion 344 of the cable fixing bolt 340. The third bolt retaining portion 353 engages the free end of the shaft portion 245 of the cable fixing bolt 340.

Figure 23:
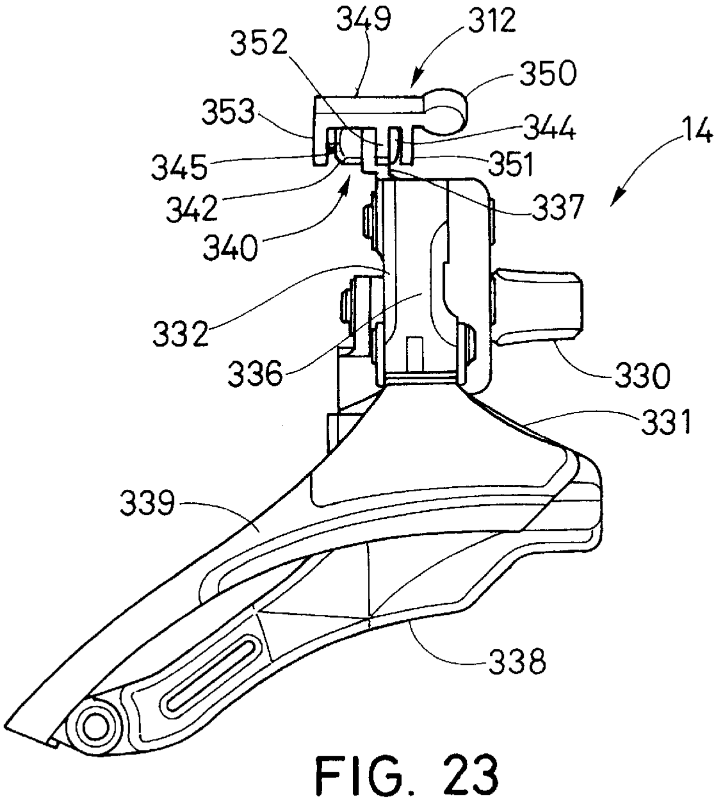
FIG. 23 is a side elevational view of a front derailleur with an alternate embodiment of a cable fixing bolt retaining clip or tool in accordance with another embodiment of the present invention.
Figure 24:
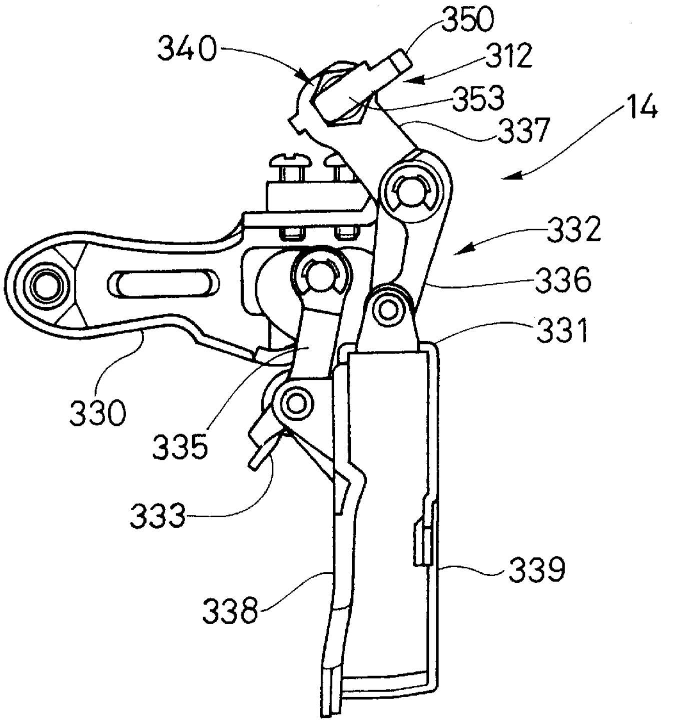
FIG. 24 is a rear elevational view of the front derailleur and the cable fixing bolt retaining clip or tool illustrated in FIG. 23.
Figure 25:
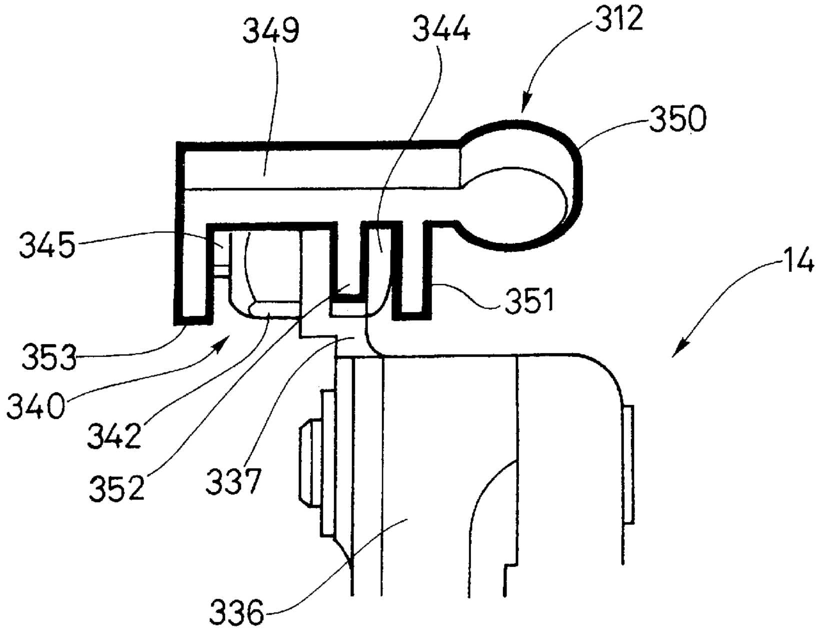
FIG. 25 is an enlarged, partial side elevational view of the front derailleur illustrated in FIGS. 23 and 24, in which the cable fixing bolt retaining clip or tool has been coupled thereto in accordance with one embodiment of the present invention.
Figure 26:
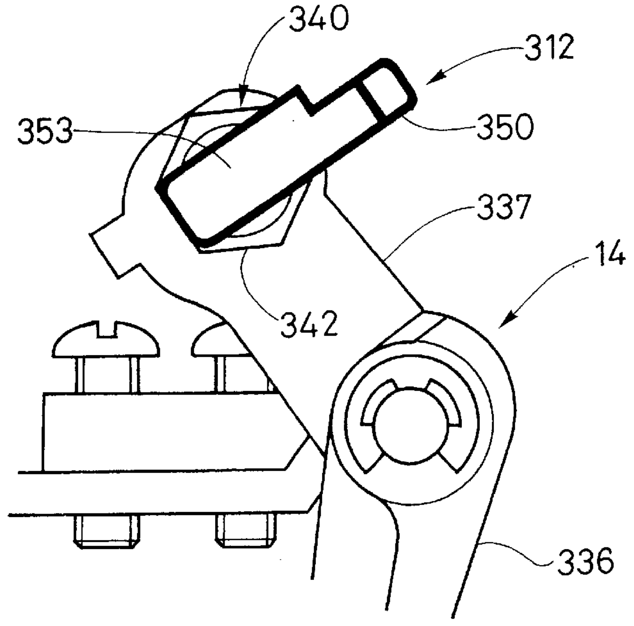
FIG. 26 is an enlarged, partial rear elevational view of the front derailleur illustrated in FIGS. 23–25, in which the cable fixing bolt retaining clip or tool has been coupled thereto.
Figure 27:
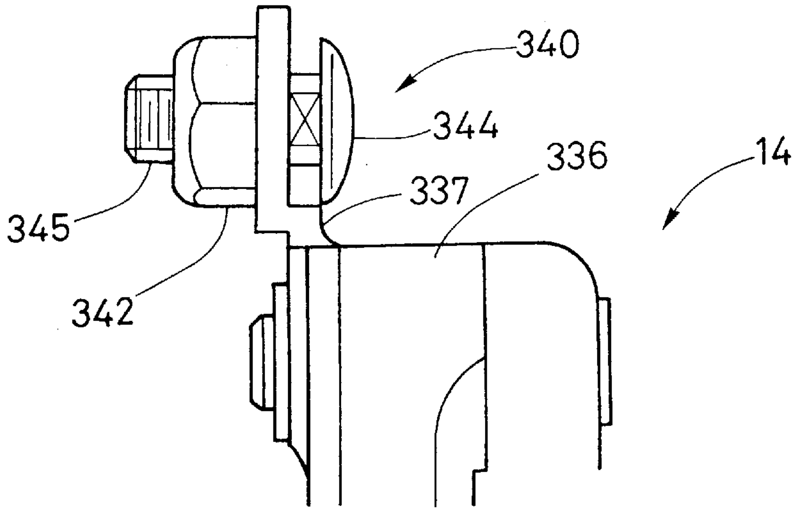
FIG. 27 is an enlarged, partial side elevational view of the front derailleur illustrated in FIGS. 23–26, in which the cable fixing bolt retaining clip or tool has been removed.
Figure 28:
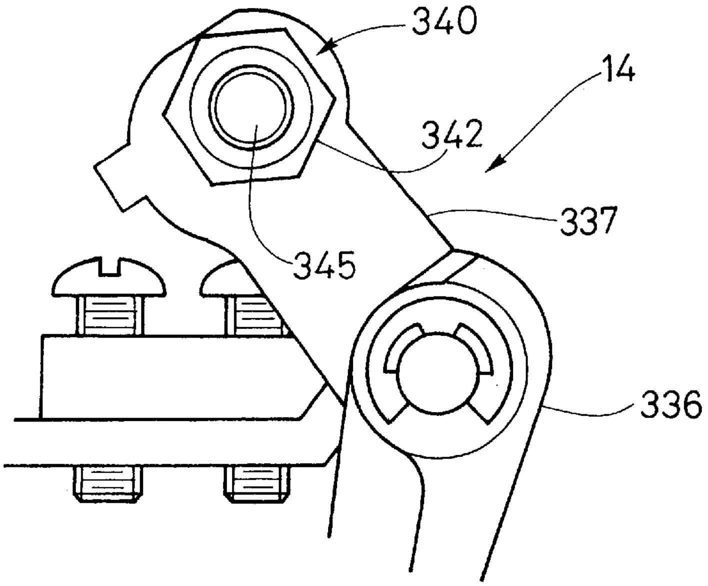
FIG. 28 is an enlarged partial rear elevational view of the front derailleur in FIGS. 23–27, in which the cable fixing bolt retaining clip or tool has been removed.

As best seen in FIG. 29, the first, second and third bolt retaining portions 351, 352 and 353 of the cable fixing bolt retaining tool 312 extend substantially perpendicular to the body portion 349 and are substantially parallel to each other. The first and second retaining portions 351 and 352 are preferably spaced apart from each other by a distance corresponding to the axial length of the head portion 344 of the cable fixing bolt 340 as seen in FIG. 23. Accordingly, when the cable fixing bolt retaining tool 312 is installed on the derailleur 14, the head portion 344 of the cable fixing bolt 340 is located between the first and second bolt retaining portions 351 and 352.

Figure 30:
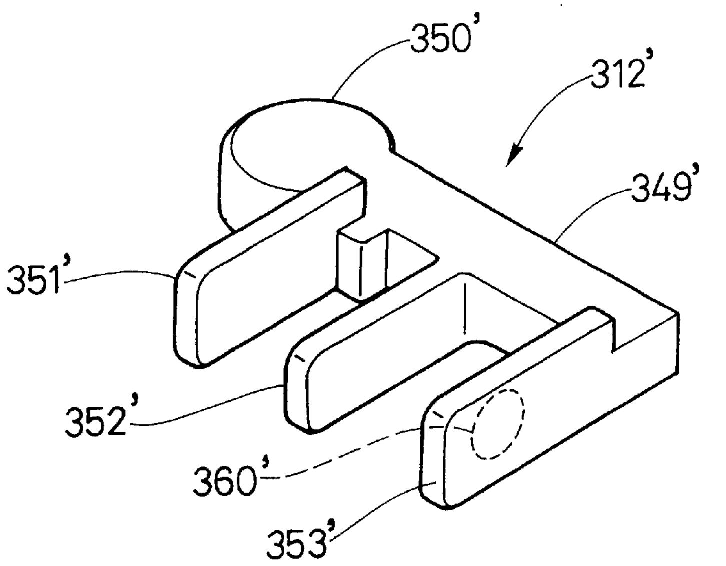
FIG. 30 is a perspective view of an alternate embodiment of a cable fixing bolt retaining clip or tool to be used with the front derailleur illustrated in FIGS. 23–26 in accordance with another embodiment of the present invention.
Figure 31:
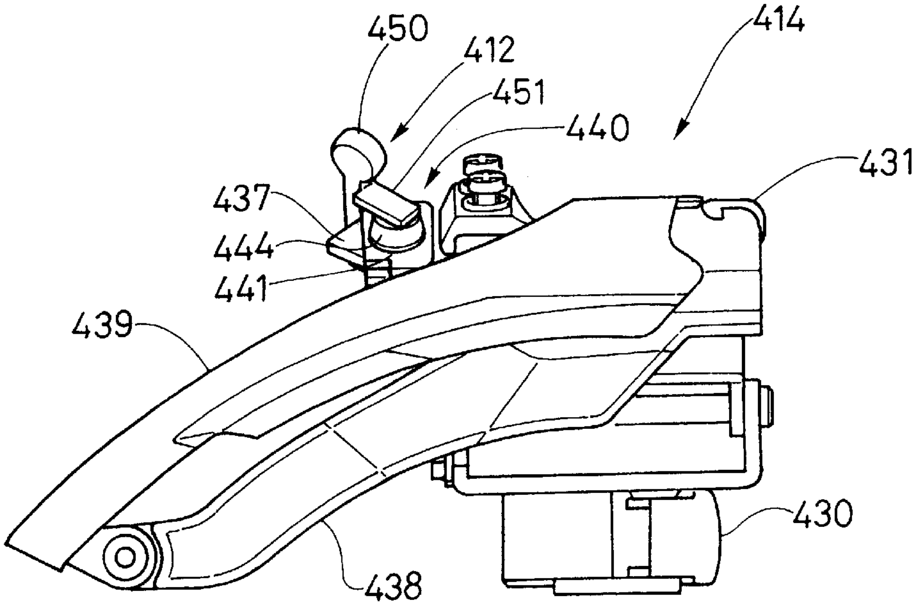
FIG. 31 is a side elevational view of an alternate embodiment of a front derailleur and an alternate embodiment of a cable fixing bolt retaining clip or tool in accordance with another embodiment of the present invention.
Figure 32:
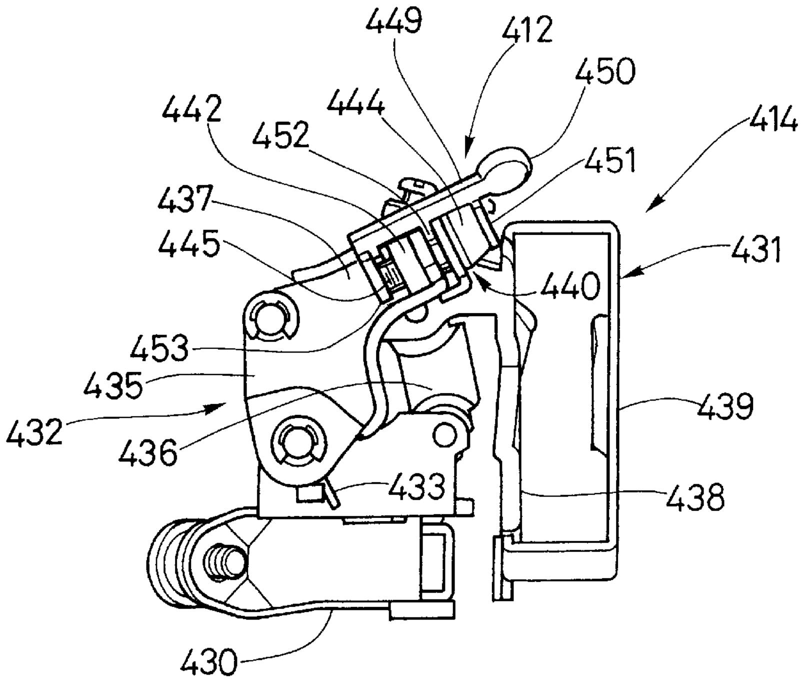
FIG. 32 is a rear elevational view of the alternate front derailleur and the cable fixing bolt retaining clip or tool illustrated in FIG. 31.

As seen in FIG. 29, the second bolt retaining portion 352 is preferably provided with a recess or notch 358 that allows the second retaining portion 352 to partially surround the non-threaded section of the shaft portion 345 of the cable fixing bolt 340. This notch or recess 358 of the second bolt retaining portion 352 also allows the first bolt retaining portion 351 to more firmly and completely engage the head portion 344 of the cable fixing bolt 340. Of course, as seen in FIG. 30, a slightly modified cable fixing bolt retaining tool 312' is illustrated in which the notch or recess of the second bolt retaining portion has been eliminated. This modified cable fixing bolt retaining tool 312' is otherwise identical to the cable fixing bolt retaining tool 312 discussed above. Therefore, the same reference numerals will be utilized to indicate the identical or substantially identical portions, but with a prime. In other words, cable fixing bolt retaining tool 312' includes a body portion 349', a gripping portion 350' and three bolt retaining portions 351', 352' and 353'.

Referring again to FIG. 29, the third bolt retaining portion 353 is preferably provided with a concavity or bore 360. The free end of the shaft portion 345 of the cable fixing bolt 340 is preferably received within the concavity or bore 360. In this preferred embodiment, the concavity or bore 360 is a blind bore. Of course, it will be apparent to those skilled in the art from this disclosure that bore 360 can be a through bore, if needed and/or desired.

FIFTH EMBODIMENT

Referring now to FIGS. 31–38, a cable fixing bolt retaining tool or clip 412 in accordance with a fifth embodiment of the present invention is illustrated on a modified front derailleur 414. This embodiment is similar to the fourth embodiment, discussed above, except that cable fixing bolt retaining tool 412 has been slightly modified to accommodate the modified arrangement of the cable fixing bolt 440 of the modified front derailleur 414.

Generally, front derailleur 414 includes a fixed member 430 non-movably secured to a bicycle frame, a movable member 431 supported to be movable relative to the fixed member 430 by a linkage assembly 432 and a biasing member or spring 433. The movable member 431 forms a chain guide having a pair of vertical plates 438 and 439 for contacting a chain. The movable member 431 is movable relative to the fixed member 430 by pulling a shift cable 20. The movable member 431 and fixed member 430 are usually interconnected through pivotal links 435 and 436. The shift cable 20 is connected to the inner link 435 to apply a torque thereto, thereby causing the links 435 and 436 to move the movable member 431. The shift cable 20 is fixed to the actuating arm 437 of the inner link 435 by a cable fixing bolt 440 and a nut 442. The nut 442 can be an integral part of the material forming the actuating arm 437 of the inner link 435 similar to the first embodiment or a separate member that engages a portion of the actuating aim 437 of the inner link 435 similar to other embodiments disclosed herein. The cable fixing bolt 440 has a head portion 444 and a threaded shaft portion 445.

Figure 37:
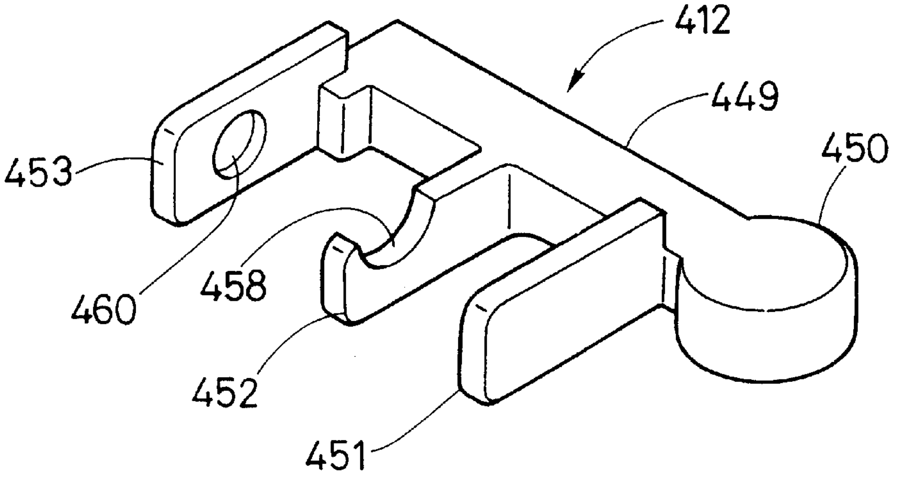
FIG. 37 is a perspective view of the cable fixing bolt retaining clip or tool utilized with the front derailleur illustrated in FIGS. 31–34.

Basically, as seen in FIG. 37, cable fixing bolt retaining tool 412 includes a body portion 449, a gripping portion 450 and three bolt retaining portions 451, 452 and 453 extending from the body portion 449. The three bolt retaining portions 451, 452 and 453 hold the cable fixing bolt 440 in a loosened condition. In this embodiment, the first bolt retaining portion 451 engages the head portion 444 of the cable fixing bolt 440. The second bolt retaining portion 452 is located adjacent the threaded shaft portion 445 of the cable fixing bolt 440. The third bolt retaining portion 453 engages the free end of the threaded shaft portion 445 of the cable fixing bolt 450.

Figure 33:
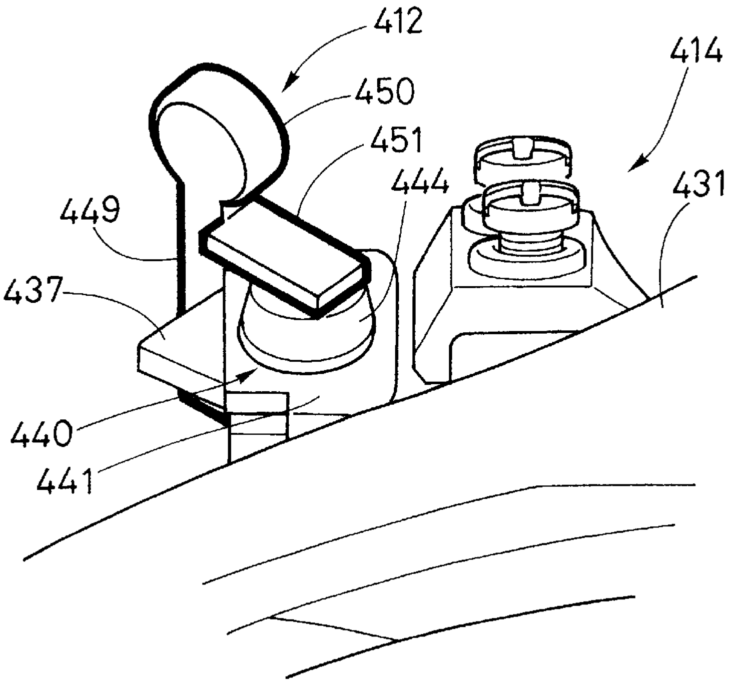
FIG. 33 is an enlarged, partial side elevational view of the front derailleur illustrated in FIGS. 31 and 32, in which the cable fixing bolt retaining clip or tool has been coupled thereto in accordance with another embodiment of the present invention.
Figure 34:
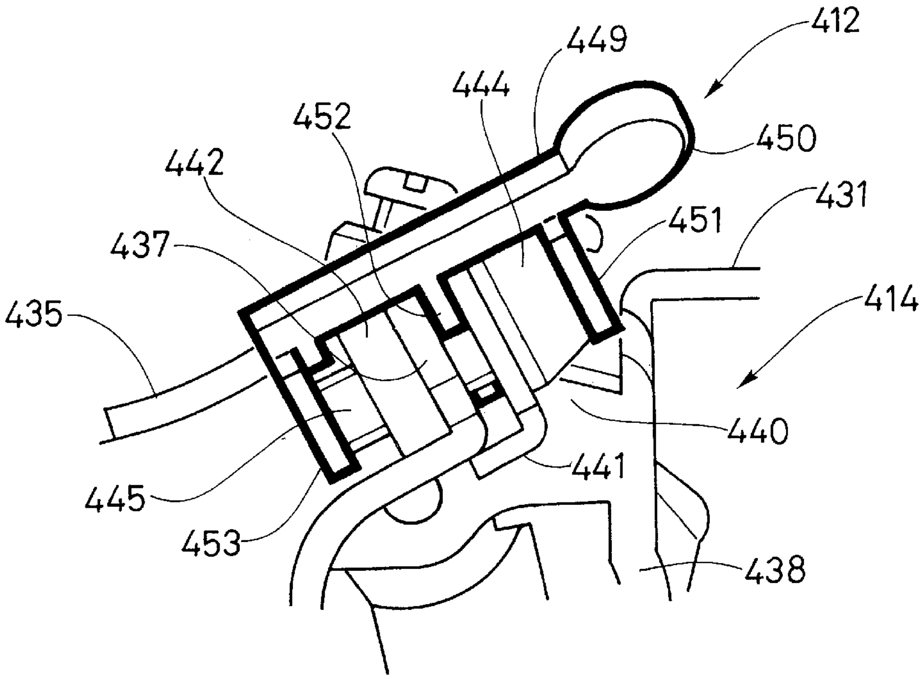
FIG. 34 is an enlarged, partial rear elevational view of the front derailleur illustrated in FIGS. 31–33, in which the cable fixing bolt retaining clip or tool has been coupled thereto.
Figure 35:
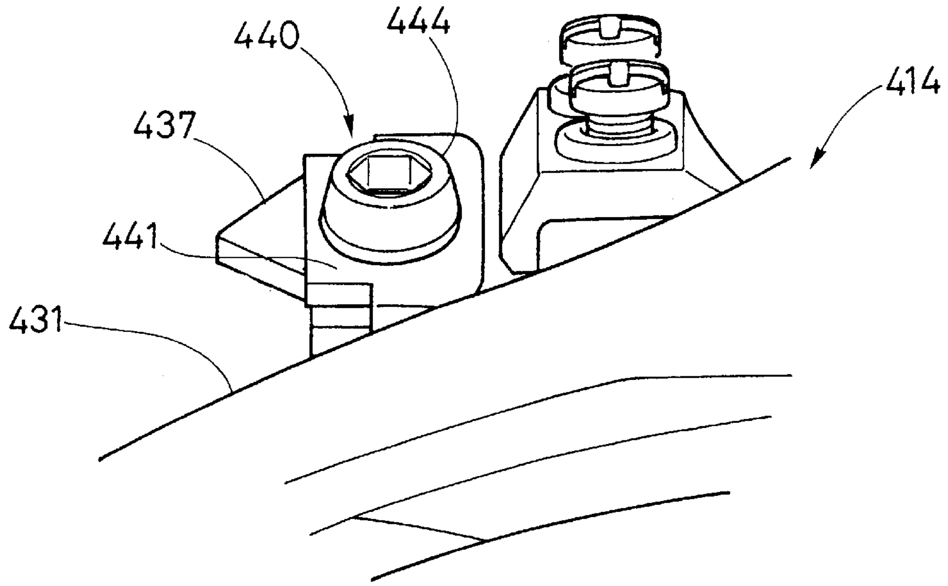
FIG. 35 is an enlarged, partial side elevational view of the front derailleur illustrated in FIGS. 31–34, in which the cable fixing bolt retaining clip or tool has been removed.
Figure 36:
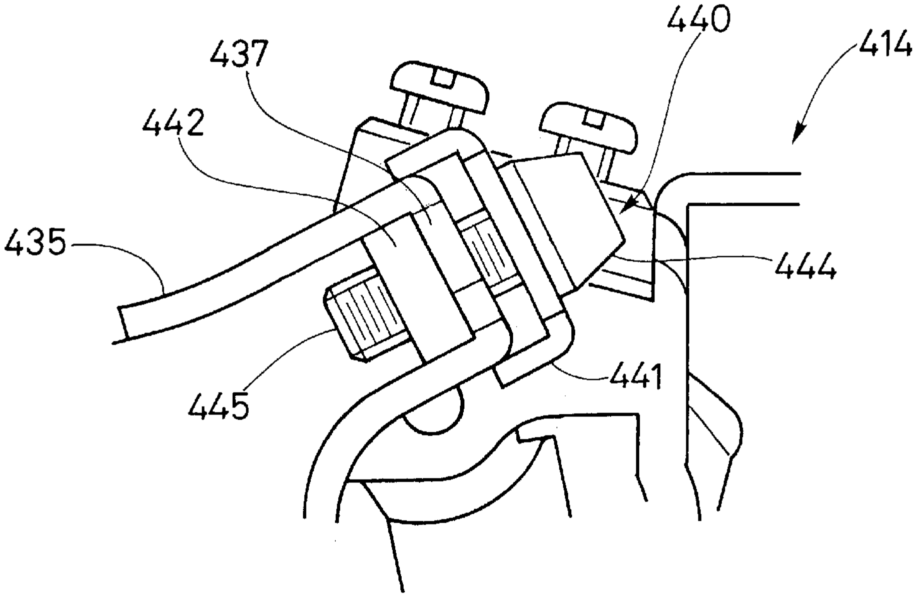
FIG. 36 is an enlarged partial rear elevational view of the front derailleur in FIGS. 31–34, in which the cable fixing bolt retaining clip or tool has been removed.

As best seen in FIG. 37, the first and second bolt retaining portions 451 and 452 of the cable fixing bolt retaining tool 412 extend substantially perpendicular to the body portion 449 and are substantially parallel to each other. The first and second retaining portions 451 and 452 are preferably spaced apart from each other by a distance corresponding to the axial length of the head portion 444 of the cable fixing bolt 440 and the thickness of the cable fixing plate 441 as seen in FIGS. 33 and 34. Accordingly, when the cable fixing bolt retaining tool 412 is installed on the derailleur 414, the head portion 444 of the cable fixing bolt 440 and the cable fixing plate 441 are located between the first and second bolt retaining portions 451 and 452. Alternatively, it will be apparent to those skilled in the art from this disclosure that the cable fixing plate 441 could be located on the opposite side of the second bolt retaining portion 452, if needed and/or desired. In this alternate possibility, the spacing between the first and second bolt retaining portions 451 and 452 would be reduced to the axial length or thickness of the head portion 444 of the cable fixing bolt 440.

Figure 38:
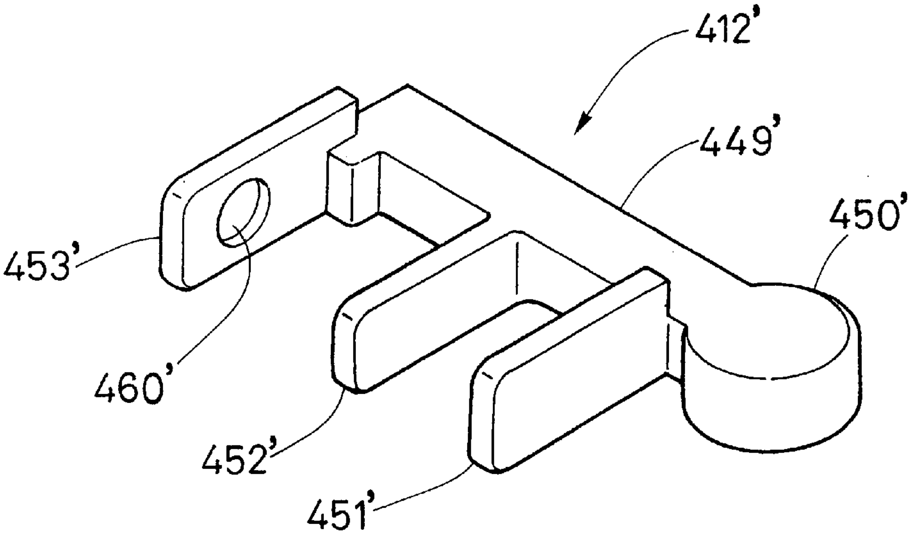
FIG. 38 is a perspective view of an alternate embodiment of a cable fixing bolt retaining clip or tool to be used with the front derailleur illustrated in FIGS. 31–34 in accordance with another embodiment of the present invention.

As seen in FIG. 37, the second bolt retaining portion 452 is preferably provided with a recess or notch 458 that allows the second retaining portion 452 to partially surround the threaded shaft portion 445 of the cable fixing bolt 440. This notch or recess 458 of the second bolt retaining portion 452 also allows the first bolt retaining portion 451 to more firmly and completely engage the head portion 444 of the cable fixing bolt 440. Of course, as seen in FIG. 38, a slightly modified cable fixing bolt retaining tool 412' is illustrated in which the notch or recess of the second bolt retaining portion has been eliminated. This modified cable fixing bolt retaining tool 412' is otherwise identical to the cable fixing bolt retaining tool 412 discussed above. Therefore, the same reference numerals will be utilized to indicate the identical or substantially identical portions, but with a prime. In other words, cable fixing bolt retaining tool 412' includes a body portion 449', a gripping portion 450' and three bolt retaining portions 451', 452' and 453'.

Referring again to FIG. 37, the third bolt retaining portion 453 is preferably provided with a concavity or bore 460. The free end of threaded shaft portion 445 of the cable fixing bolt 440 is preferably received within the concavity or bore 460. In this preferred embodiment, the concavity or bore 460 is a blind bore. Of course, it will be apparent to those skilled in the art from this disclosure that bore 460 can be a through bore, if needed and/or desired.

SIXTH EMBODIMENT

Figure 39:
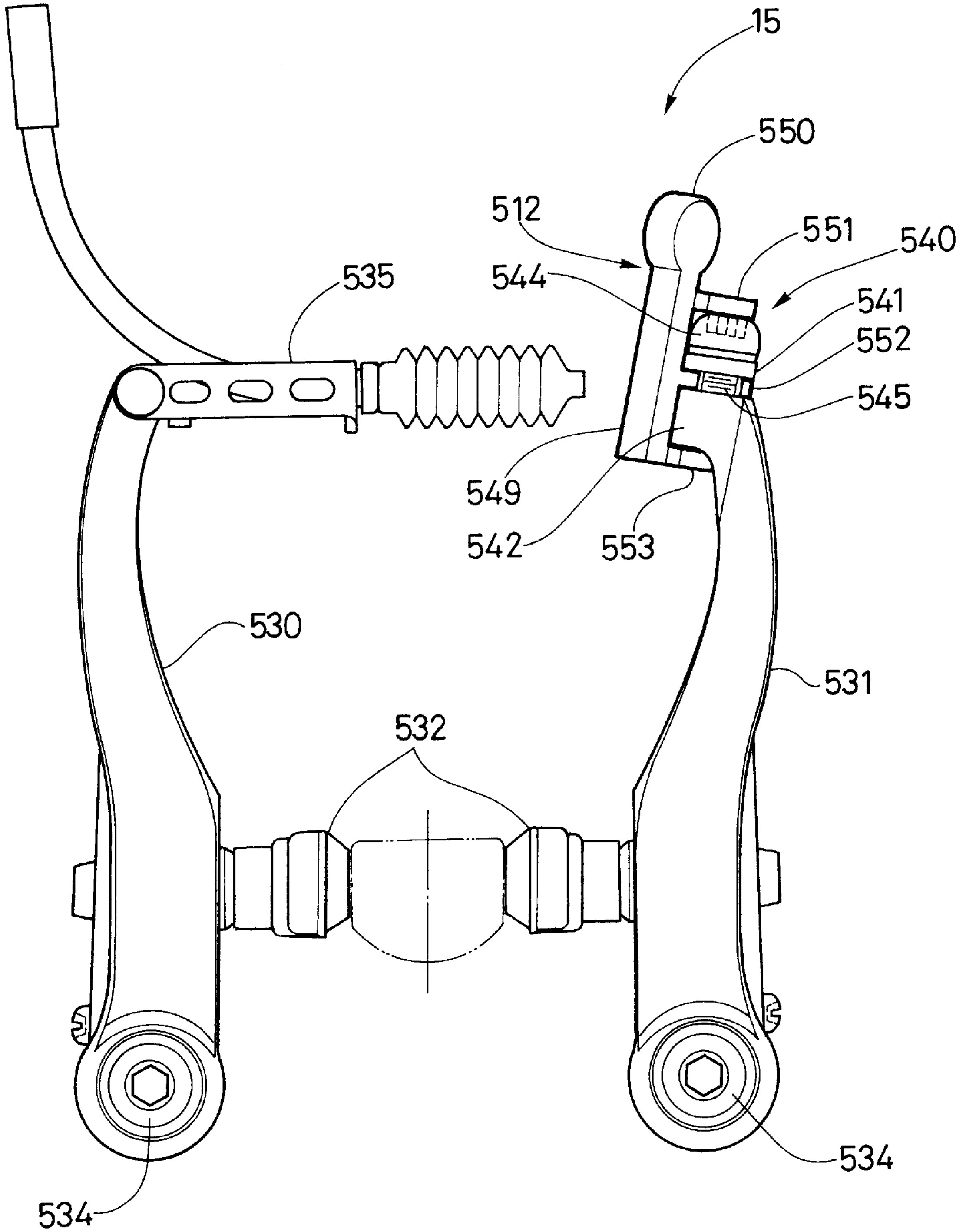
FIG. 39 is a front elevational view of a brake and an alternate embodiment of a cable fixing bolt retaining clip or tool coupled thereto in accordance with another embodiment of the present invention.
Figure 40:
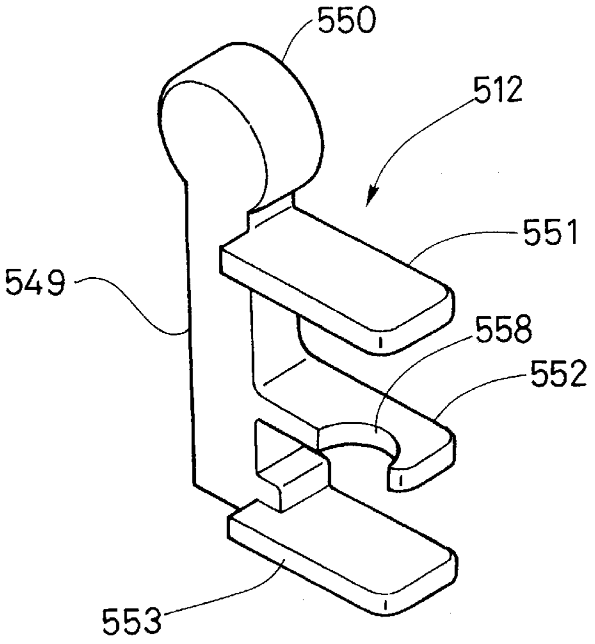
FIG. 40 is a perspective view of the cable fixing bolt retaining clip or tool utilized with the brake illustrated in FIG. 39.
Figure 41:
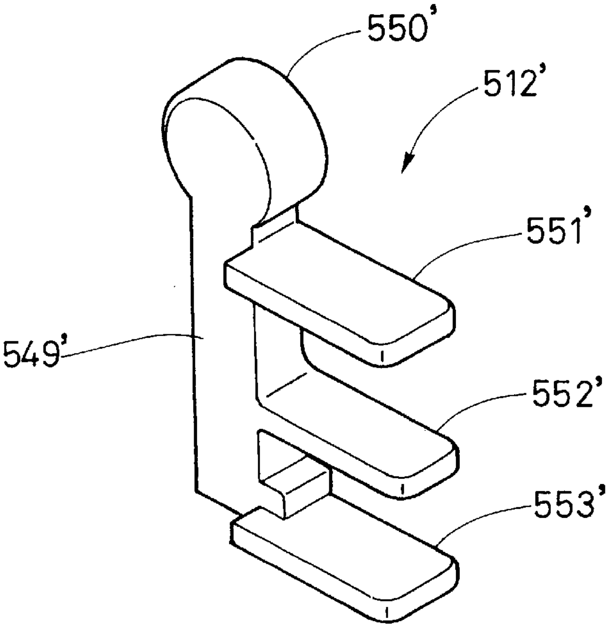
FIG. 41 is a perspective view of an alternate embodiment of a cable fixing bolt retaining clip or tool to be used with the brake illustrated in FIG. 39 in accordance with another embodiment of the present invention.

Referring now to FIGS. 39–41, a sixth embodiment of a cable fixing bolt retaining tool or clip 512 in accordance with the present invention is illustrated as being used with one of the brakes 15 of bicycle 10. The cable fixing bolt retaining tool or clip 512 of this embodiment is similar to the prior embodiments, discussed above, except that cable fixing bolt retaining tool 512 has been slightly modified to be used with one or both of the brakes 15 of bicycle 10.

Each of the brakes 15 has a pair of brake arms 530 and 531 with brake shoes 532 fixedly coupled thereto. The bottom ends of brake arms 530 and 531 are pivotally coupled to the frame of the bicycle 10 via attachment bolts 534. The upper ends of the brake arms 530 and 531 are coupled to brake cable 24 via a linking arm 535 and a cable fixing bolt 540. The cable fixing bolt 540 is threaded into a threaded hole in the upper part of brake arm 531. The upper portion of brake arm 531 forms a nut portion 542 that is integrally formed with brake arm 531. The cable fixing bolt

540 has a cable fixing plate 541 located thereon for engaging brake cable 24. More specifically, the cable fixing bolt 540 has a head portion 544 and a threaded shaft portion 545 with cable fixing plate 541 located thereon.

Basically, as seen in FIG. 40, cable fixing bolt retaining tool 512 includes a body portion 549, a gripping portion 550 and three bolt retaining portions 551, 552 and 553 extending from the body portion 549. The three bolt retaining portions 551, 552 and 553 hold the cable fixing bolt 540 in a loosened condition. In this embodiment, the first bolt retaining portion 551 engages the head portion 544 of the cable fixing bolt 540. The second bolt retaining portion 552 is located adjacent the threaded shaft portion 545 of the cable fixing bolt 540. The third bolt retaining portion 553 engages the nut portion 542 of the brake arm.

As best seen in FIG. 40, the first and second bolt retaining portions 551 and 552 of the cable fixing bolt retaining tool 512 extend substantially perpendicular to the body portion 549 and are substantially parallel to each other. The first and second retaining portions 551 and 552 are preferably spaced apart from each other by a distance corresponding to the axial length of the head portion 544 of the cable fixing bolt 540 and the thickness of the cable fixing plate 541 as seen in FIG. 39. Accordingly, when the cable fixing bolt retaining tool 512 is installed on the brake 15, the head portion 544 of the cable fixing bolt 540 and the cable fixing plate 541 are located between the first and second bolt retaining portions 551 and 552. Alternatively, it will be apparent to those skilled in the art from this disclosure that the cable fixing plate 541 could be located on the opposite side of the second bolt retaining portion 552, if needed and/or desired. In this alternate possibility, the spacing between the first and second bolt retaining portions 551 and 552 would be reduced to the axial length or thickness of the head portion 544 of the cable fixing bolt 540.

As seen in FIG. 40, the second bolt retaining portion 552 is preferably provided with a recess or notch 558 that allows the second retaining portion 552 to partially surround the threaded shaft portion 545 of the cable fixing bolt 540. This notch or recess 558 of the second bolt retaining portion 552 also allows the first bolt retaining portion 551 to more firmly and completely engage the head portion 544 of the cable fixing bolt 540. Of course, as seen in FIG. 41, a slightly modified cable fixing bolt retaining tool 512' is illustrated in which the notch or recess of the second bolt retaining portion has been eliminated. This modified cable fixing bolt retaining tool 512' is otherwise identical to the cable fixing bolt retaining tool 512 discussed above. Therefore, the same reference numerals will be utilized to indicate the identical or substantially identical portions, but with a prime. In other words, cable fixing bolt retaining tool 512' includes a body portion 549', a gripping portion 550' and three bolt retaining portions 551', 552' and 553'.

SEVENTH EMBODIMENT

Figure 42:
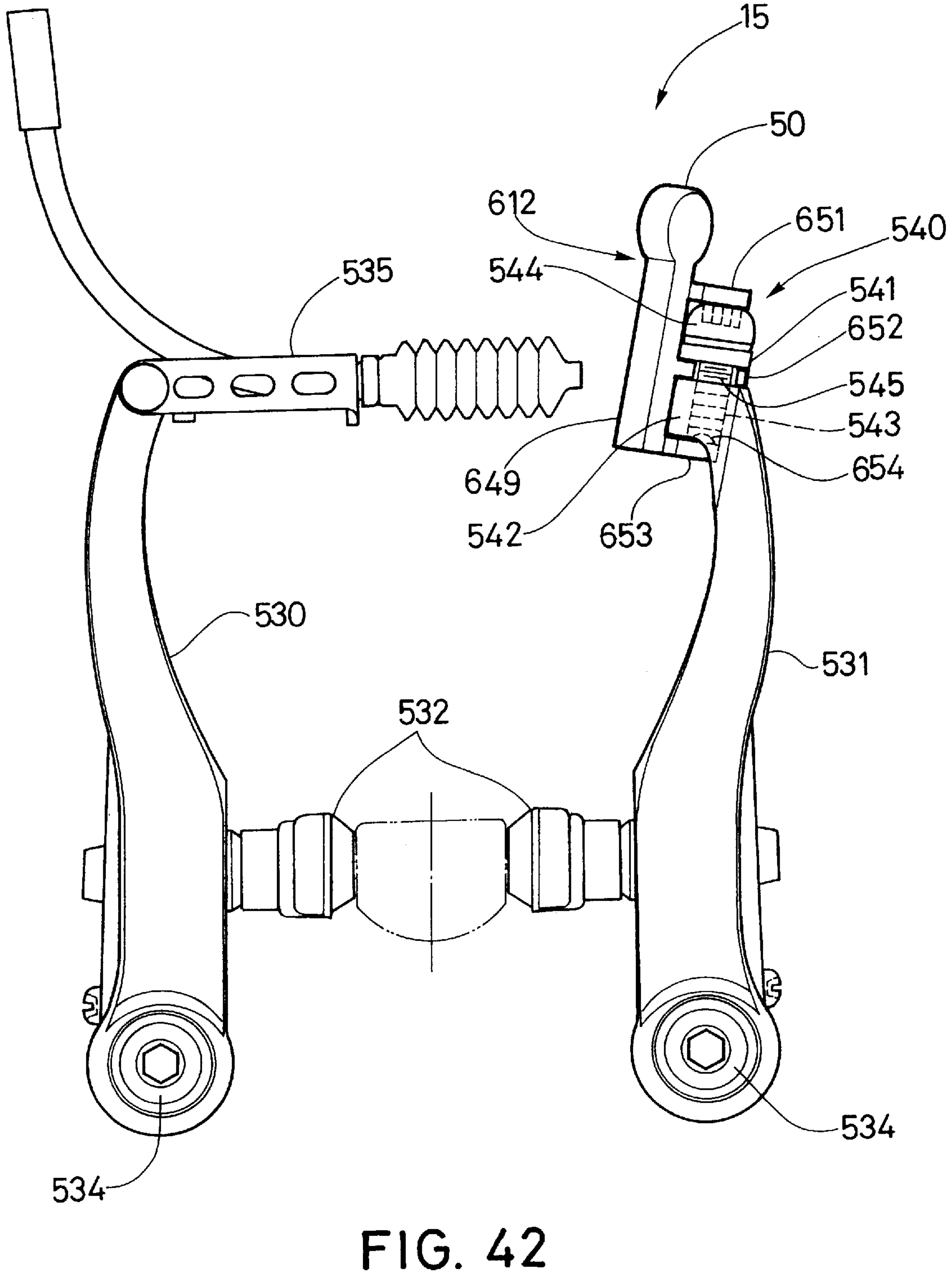
FIG. 42 is a front elevational view of a brake and an alternate embodiment of a cable fixing bolt retaining clip or tool coupled thereto in accordance with another embodiment of the present invention.
Figure 43:
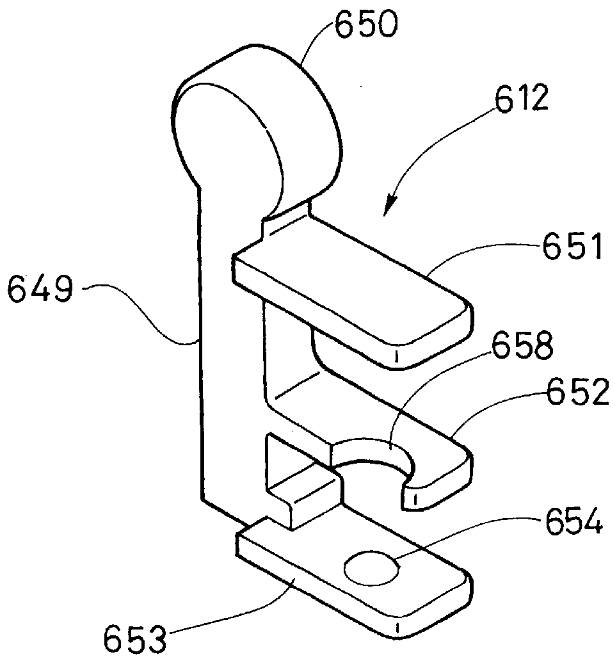
FIG. 43 is a perspective view of the cable fixing bolt retaining clip or tool utilized with the brake illustrated in FIG. 42.
Figure 44:
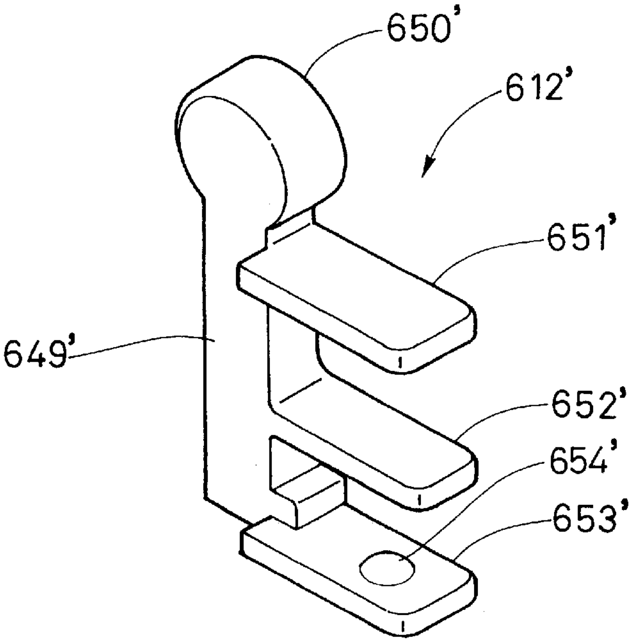
FIG. 44 is a perspective view of an alternate embodiment of a cable fixing bolt retaining clip or tool to be used with the brake illustrated in FIG. 42 in accordance with another embodiment of the present invention.

Referring now to FIGS. 42–44, a seventh embodiment of a cable fixing bolt retaining tool or clip 612 in accordance with the present invention is illustrated as being used with one of the brakes 15 of bicycle 10. The cable fixing bolt retaining tool or clip 612 of this embodiment is similar to the sixth embodiment, discussed above, except that cable fixing bolt retaining tool 612 has been slightly modified.

Basically, as seen in FIG. 43, cable fixing bolt retaining tool 612 includes a body portion 649, a gripping portion 650 and three bolt retaining portions 651, 652 and 653 extending from the body portion 649. The three bolt retaining portions 651, 652 and 653 hold the cable fixing bolt 540 in a loosened condition. In this embodiment, the first bolt retaining portion 651 engages the head portion 544 of the cable fixing bolt 540. The second bolt retaining portion 652 is located adjacent the threaded shaft portion 545 of the cable fixing bolt 540. The third bolt retaining portion 653 engages the nut portion 542 of the brake arm. In this embodiment, the third bolt retaining portion 653 has a protrusion 654 that is received in the threaded hole 543 of the nut portion 542. The end of the threaded shaft portion 545 of cable fixing bolt 540 is spaced from protrusion 654.

As best seen in FIG. 43, the first and second bolt retaining portions 651 and 652 of the cable fixing bolt retaining tool 612 extend substantially perpendicular to the body portion 649 and are substantially parallel to each other. The first and second retaining portions 651 and 652 are preferably spaced apart from each other by a distance corresponding to the axial length of the head portion 544 of the cable fixing bolt 540 and the thickness of the cable fixing plate 541 as seen in FIG. 42. Accordingly, when the cable fixing bolt retaining tool 612 is installed on the brake 15, the head portion 544 of the cable fixing bolt 540 and the cable fixing plate 541 are located between the first and second bolt retaining portions 651 and 652.

As seen in FIG. 43, the second bolt retaining portion 652 is preferably provided with a recess or notch 658 that allows the second retaining portion 652 to partially surround the threaded shaft portion 545 of the cable fixing bolt 540. This notch or recess 658 of the second bolt retaining portion 652 also allows the first bolt retaining portion 651 to more firmly and completely engage the head portion 544 of the cable fixing bolt 540. Of course, as seen in FIG. 44, a slightly modified cable fixing bolt retaining tool 612' is illustrated in which the notch or recess of the second bolt retaining portion has been eliminated. This modified cable fixing bolt retaining tool 612' is otherwise identical to the cable fixing bolt retaining tool 612 discussed above. Therefore, the same reference numerals will be utilized to indicate the identical or substantially identical portions, but with a prime. In other words, cable fixing bolt retaining tool 612' includes a body portion 649', a gripping portion 650' and three bolt retaining portions 651', 652' and 653'. The third bolt retaining portion 653' has a protrusion 654' for engaging threaded hole 543 of the nut portion 542.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle component assembly, comprising:

a bicycle component having a first bicycle part with a threaded bolt receiving opening;

a cable fixing bolt having a head portion and a shaft portion that extends from said head portion to a free end, said shaft portion having threads formed thereon that are engaged with said threaded bolt receiving opening; and a tool removably coupled to said cable fixing bolt, said tool including:

first portion engaging said head portion of said cable fixing bolt, a second portion located adjacent a portion of said shaft portion of said cable fixing bolt, and a third portion engaging at least one of said shaft portion and said first bicycle part, said first, second and third portions being arranged relative one another to hold said cable fixing bolt in a loose condition, while preventing said cable fixing bolt from being disengaged from said first bicycle part.

2. A bicycle component assembly according to claim 1, wherein said bicycle component is a rear derailleur.

3. A bicycle component assembly according to claim 1, wherein said bicycle component is a front derailleur.

4. A bicycle component assembly according to claim 1, wherein said bicycle component is a brake device.

5. A bicycle component assembly according to claim 1, further comprising a cable fixing plate located on said shaft portion between said head portion and said first bicycle part.

6. A bicycle component assembly according to claim 1, wherein said tool is formed of a non-metallic material.

7. A bicycle component assembly according to claim 1, wherein said second portion of said tool has a recess with said shaft portion of said cable fixing bolt located therein.

8. A bicycle component assembly according to claim 1, wherein said first, second and third portions of said tool are substantially parallel members.

9. A bicycle component assembly according to claim 1, wherein said first, second and third portions of said tool are integrally formed as a one-piece, unitary member.

10. A bicycle component assembly according to claim 1, wherein said first and second portions of said tool are substantially parallel members, while said third portion of said tool is retained between said first bicycle part and a second bicycle part by a biasing member.

11. A bicycle component assembly according to claim 1, wherein said third portion engages said shaft portion of said cable fixing bolt.

12. A bicycle component assembly according to claim 1, wherein said third portion engages said first bicycle part.

13. A bicycle component assembly according to claim 2, wherein said first bicycle part is a link member of said rear derailleur.

14. A bicycle component assembly according to claim 2, wherein said first bicycle part is a nut positioned adjacent a link member of said rear derailleur that has non-threaded hole with said shaft portion being located therein.

15. A bicycle component assembly according to claim 3, wherein said first bicycle part is a link member of said front derailleur.

16. A bicycle component assembly according to claim 3, wherein said first bicycle part is a nut positioned adjacent a link member of said front derailleur that has non-threaded hole with said shaft portion being located therein.

17. A bicycle component assembly according to claim 4, wherein said first bicycle part is a brake arm.

18. A bicycle component assembly according to claim 10, wherein said biasing member urges said first and second bicycle parts from a retracted position to an extended position, said third portion of said tool being located between said first and second bicycle parts to prevent said first and second bicycle parts from moving to said extended position.

19. A bicycle component assembly according to claim 11, further comprising a cable fixing plate located on said shaft portion between said head portion and said first bicycle part.

20. A bicycle component assembly according to claim 11, wherein said third portion includes a bore that receives said free end of said shaft portion therein.

21. A bicycle component assembly according to claim 12, wherein said first, second and third portions of said tool are substantially parallel members.

22. A bicycle component assembly according to claim 18, further composing a cable fixing plate located on said shaft portion between said head portion and said first bicycle part.

23. A bicycle component assembly according to claim 12, wherein said third portion of said tool is retained between said first bicycle part and a second bicycle part by a biasing member that urges said first and second bicycle parts from a retracted position to an extended position, said third portion of said tool being located between said first and second bicycle parts to prevent said first and second bicycle parts from moving to said extended position.

24. A bicycle component assembly according to claim 20, wherein said bore of said third portion is a blind bore that receives said free end of said shaft portion therein.

25. A bicycle component assembly according to claim 20, wherein said bore of said third portion is a through bore that receives said free end of said shaft portion therein.

26. A bicycle component assembly according to claim 21, further composing a cable fixing plate located on said shaft portion between said head portion and said first bicycle part.

27. A bicycle component assembly according to claim 23, wherein said third portion of said tool has a recess that engages said second bicycle part to limit relative movement therebetween.

28. A bicycle component assembly according to claim 27, wherein said first and second portions of said tool are substantially parallel members.

29. A bicycle component assembly according to claim 28, further comprising a cable fixing plate located on said shaft portion between said head portion and said first bicycle part.

* * * * *